(12) United States Patent
Chou et al.

(10) Patent No.: US 7,934,037 B2
(45) Date of Patent: Apr. 26, 2011

(54) EXTENDED SECURE-DIGITAL (SD) DEVICES AND HOSTS

(75) Inventors: Horng-Yee Chou, Palo Alto, CA (US); Szu-Kuang Chou, Cupertino, CA (US); Kuang-Yu Wang, Saratoga, CA (US); I-Kang Yu, Palo Alto, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 12/847,965

(22) Filed: Jul. 30, 2010

(65) Prior Publication Data
US 2010/0312933 A1 Dec. 9, 2010

Related U.S. Application Data

(60) Division of application No. 10/854,004, filed on May 25, 2004, now Pat. No. 7,836,236, and a continuation-in-part of application No. 10/708,634, filed on Mar. 16, 2004, now Pat. No. 7,069,369.

(51) Int. Cl.
*G06F 3/00* (2006.01)
*G06F 13/12* (2006.01)
*H05K 7/10* (2006.01)

(52) U.S. Cl. .............. 710/301; 710/11; 710/14; 710/16; 710/62

(58) Field of Classification Search .................. None
See application file for complete search history.

(56) References Cited

U.S. PATENT DOCUMENTS

| | | | |
|---|---|---|---|
| 4,686,506 A | 8/1987 | Farago | |
| 4,818,239 A | 4/1989 | Erk | |
| 5,330,360 A | 7/1994 | Marsh et al. | |
| 5,339,222 A | 8/1994 | Simmons et al. | |
| 5,386,340 A | 1/1995 | Kurz | |
| 5,420,412 A | 5/1995 | Kowalski | |
| 5,450,396 A | 9/1995 | Havermans | |
| 5,476,387 A | 12/1995 | Ramey et al. | |
| 5,652,839 A | 7/1997 | Giorgio et al. | |
| 5,718,599 A | 2/1998 | Ichikawa et al. | |
| 5,725,395 A | 3/1998 | Lee | |
| 5,766,033 A | 6/1998 | Davis | |
| 5,772,453 A | 6/1998 | Tan et al. | |
| 5,941,733 A | 8/1999 | Lai | |
| 6,027,375 A | 2/2000 | Wu | |
| 6,089,879 A | 7/2000 | Babcock | |
| 6,091,605 A | 7/2000 | Ramey et al. | |
| 6,165,016 A | 12/2000 | Lai | |
| 6,314,479 B1 | 11/2001 | Frederick et al. | |
| 6,334,793 B1 | 1/2002 | Amoni et al. | |
| 6,353,866 B1 | 3/2002 | Fensore et al. | |
| 6,354,883 B2 | 3/2002 | Jaing | |
| 6,356,582 B1 | 3/2002 | Mazer et al. | |
| 6,370,603 B1 | 4/2002 | Silverman et al. | |

(Continued)

OTHER PUBLICATIONS

SD Group, SD-Memory Card Specifications, Part 1, Physical Layer Spec. Ver. 1.01, Mar. 2001, pp. 1-32.

(Continued)

*Primary Examiner* — Alan Chen

(74) *Attorney, Agent, or Firm* — Bever, Hoffman & Harms LLP; Patrick T. Bever

(57) ABSTRACT

Systems and methods for communicating using various protocols through the Secured Digital (SD) physical interface are disclosed. The invention covers, among others, single-mode and multi-mode hosts, single-mode and multi-mode devices, as well as techniques for initializing these hosts and devices in order to facilitate the aforementioned communication.

16 Claims, 24 Drawing Sheets

U.S. PATENT DOCUMENTS

| | | |
|---|---|---|
| 6,385,677 B1 | 5/2002 | Yao |
| 6,415,342 B1 | 7/2002 | Wahl et al. |
| 6,438,638 B1 | 8/2002 | Jones et al. |
| 6,439,464 B1 | 8/2002 | Fruhauf et al. |
| 6,445,088 B1 | 9/2002 | Spitaels et al. |
| 6,453,371 B1 | 9/2002 | Hampson et al. |
| 6,501,163 B1 | 12/2002 | Utsumi |
| 6,533,612 B1 | 3/2003 | Lee et al. |
| 6,554,648 B2 | 4/2003 | Shi et al. |
| 6,561,421 B1 | 5/2003 | Yu |
| 6,567,273 B1 | 5/2003 | Liu et al. |
| 6,578,768 B1 | 6/2003 | Binder et al. |
| 6,581,122 B1 | 6/2003 | Sarat |
| 6,599,152 B1 | 7/2003 | Oliphant et al. |
| 6,602,088 B1 | 8/2003 | Zhu |
| 6,609,928 B1 | 8/2003 | Le |
| 6,628,498 B2 | 9/2003 | Whitney et al. |
| 6,634,561 B1 | 10/2003 | Wallace |
| 6,651,212 B1 | 11/2003 | Katayama et al. |
| 6,658,516 B2 | 12/2003 | Yao |
| 6,659,805 B2 | 12/2003 | Siddiqui et al. |
| 6,666,724 B1 | 12/2003 | Lwee |
| 6,692,268 B2 | 2/2004 | Kung et al. |
| 6,692,312 B1 | 2/2004 | Semmeling et al. |
| 6,705,902 B1 | 3/2004 | Yi et al. |
| 6,712,646 B2 | 3/2004 | Shindo |
| 6,719,570 B2 | 4/2004 | Tsuchioka |
| 6,745,267 B2 | 6/2004 | Chen et al. |
| 6,752,321 B1 | 6/2004 | Leaming |
| 6,758,685 B1 | 7/2004 | Huang et al. |
| 6,763,408 B1 | 7/2004 | Sonoda |
| 6,778,401 B1 | 8/2004 | Yu et al. |
| 6,801,971 B1 | 10/2004 | Devine et al. |
| 6,813,662 B2 | 11/2004 | Park |
| 6,854,984 B1 | 2/2005 | Lee et al. |
| 6,857,897 B2 | 2/2005 | Conn |
| 6,860,609 B2 | 3/2005 | Olson et al. |
| 6,871,244 B1 | 3/2005 | Cahill et al. |
| 6,874,044 B1 | 3/2005 | Chou et al. |
| 6,890,207 B2 | 5/2005 | Kobayashi |
| 6,908,038 B1 | 6/2005 | Le |
| 6,908,330 B2 | 6/2005 | Garrett et al. |
| 6,973,658 B2 | 12/2005 | Nguyen |
| 7,104,807 B1 | 9/2006 | Wang et al. |
| 7,104,848 B1 | 9/2006 | Chou et al. |
| 7,108,560 B1 | 9/2006 | Chou et al. |
| 7,125,287 B1 | 10/2006 | Chou et al. |
| 7,182,646 B1 | 2/2007 | Chou et al. |
| 7,186,147 B1 | 3/2007 | Chou et al. |
| 2003/0041284 A1 | 2/2003 | Mambakkam et al. |
| 2003/0046472 A1 | 3/2003 | Morrow |
| 2003/0094490 A1 | 5/2003 | Lee |
| 2003/0100203 A1 | 5/2003 | Yen |
| 2003/0104835 A1 | 6/2003 | Douhet |
| 2003/0145141 A1 | 7/2003 | Chen et al. |
| 2003/0154340 A1 | 8/2003 | Bolt et al. |
| 2003/0229748 A1 | 12/2003 | Brewer et al. |
| 2004/0087213 A1 | 5/2004 | Kao |
| 2004/0176927 A1 | 9/2004 | Chen et al. |
| 2005/0048846 A1 | 3/2005 | Suzuki et al. |
| 2005/0059301 A1 | 3/2005 | Chou et al. |

OTHER PUBLICATIONS

Mahon: "MultiMediaCard Specification, version 4.0 is released", Press Release, Feb. 2004, pp. 1-3.

PQI, "Intelligent Stick 2.0", Oct. 14, 2004, pp. 1-3, http://www.pqi.com.lw/eng/ourproductlourproduct.h.

"PCI Express" Architecture Initiative Overview, Oct. 2003, pp. 1-30, www.express-lane.org.

"Product Specification: PCMCIA Memory Card Connector," Specification No. PS98007 Rev. 2, Dec. 2, 2001, pp. 1.

Larky et al., "You've Come A Long Way, USB (history and future of USB port technology)," Jul. 23, 2001, Electronic News, pp. 1-2.

Brewer et al., "PCI Express Technology," Feb. 2004, White Paper Dell, pp. 1-11.

"Errata for 'USB Revision 2.0 Apr. 27, 2000' as of May 28, 2002", pp. 1-7. www.usb.org.

Tyco Electronics., "Design Objectives: ExpressCard Connector," 108-5923, Aug. 27, 2003, pp. 1-10.

"USB 2.0 Specification Engineering Change Notice (ECN) #1: Mini-B Connector," Oct. 20, 2000, 44 pages.

"Errata for 'USB Revision 2.0 Apr. 27, 2000' as of Dec. 7, 2000", pp. 1-31.

PCMCIA, "The ExpressCard(TM) Standard—The Next Generation PC Card Technology," Oct. 2003, pp. 1-4.

"On-The-Go Supplement to the USB 2.0 Specification: Revision 1.0a," Jun. 24, 2003, pp. 1-77.

"Connector Supports Removable ExpressCardTM modules," Jun. 27, 2005, 1 page. www.news.thomasnet.com/fullstory/464708.

ExpressCard, "ExpressCard Questions and Answers," Mar. 17, 2006, pp. 1-6 http://www.expresscard.org/web/site/qa.jsp.

PCMCIA, "About PCMCIA," Mar. 17, 2006, pp. 1-5. http://www.pcmcia.org/about.htm.

"ExpressCard: Changing the Face Of Computing," Nov. 24, 2003, pp. 1-3. http://www.elecdesign.com/Articles/Index.cfm?AD=1&ArticleID=6608.

U.S. Appl. No. 11/467,137, filed Aug. 24, 2006; Inventors: Chou et al.

U.S. Appl. No. 11/467,134, filed Aug. 24, 2006; Inventors: Chou et al.

U.S. Appl. No. 11/076,514, filed Mar. 8, 2005; Inventors: Yu et al.

"Notice of Office Action," mailed Nov. 14, 2006 for U.S. Appl. No. 11/467,134, filed Aug. 24, 2006; Inventors: Chou et al.

"Notice of Office Action," mailed Mar. 16, 2007 for U.S. Appl. No. 11/076,514, filed Mar. 8, 2005; Inventors: Yu et al.

VSD HOST DEVICE DRIVER INIT PROCESS

VSD DEVICE-SIDE CONTROLLER INITIALIZATION PROCESS

ALTERNATIVE (INCLUDING SINGLE MODE) HOST DETECTING DEVICE SEQUENCE

SINGLE MODE DEVICE POWER-ON SEQUENCE

HOST

| PIN | DIR | MMC | SPI | SD | EMMC | USB | EUSB | PCIE | SATA | 1394 |
|---|---|---|---|---|---|---|---|---|---|---|
| 1 | I/O | DAT3 | CS | DAT3 | | | D1- | PETn | A- | TPA* |
| 2 | I/O | CMD | DIN | CMD | CMD | | | PETp | A+ | TPA |
| 3 | GND | VSS1 | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD | VDD |
| 5 | — | CLK | CLK | CLK | CLK | | | REFCLK+ | | |
| 6 | GND | VSS2 | VSS2 | VSS2 | VSS2 | | VSS2 | VSS2 | VSS2 | VSS2 |
| 7 | I/O | DAT0 | DOUT | DAT0 | | | D+ | REFCLK- | | |
| 8 | I/O | DAT1 | | DAT1 | D- | D- | D- | PERp | B+ | TPB |
| 9 | I/O | DAT2 | DAT2 | DAT2 | D+ | D+ | D1+ | PERn | B- | TPB* |

FIG. 10A

| PIN | DIR | MMC | SPI | SD | EMMC | USB | EUSB | PCIE | SATA | 1394 |
|---|---|---|---|---|---|---|---|---|---|---|
| 1 | I/O | DAT3 | CS | DAT3 | DAT3 | DAT3 | D1- | PETn | A- | TPA* |
| 2 | I/O | CMD | DIN | CMD | CMD | CMD | CMD | PETp | A+ | TPA |
| 3 | GND | VSS1 | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD | VDD |
| 5 | — | CLK | CLK | CLK | CLK | CLK | CLK | REFCLK+ | CLK | CLK |
| 6 | GND | VSS2 | VSS2 | VSS2 | VSS2 | VSS2 | VSS2 | VSS2 | VSS2 | VSS2 |
| 7 | I/O | DAT0 | DOUT | DAT0 | DAT0 | DAT0 | D+ | REFCLK- | DAT0 | DAT0 |
| 8 | I/O | DAT1 | DAT1 | DAT1 | D- | D- | D- | PERp | B+ | TPB |
| 9 | I/O | DAT2 | DAT2 | DAT2 | D+ | D+ | D1+ | PERn | B- | TPB* |

FIG. 10B

| PIN | DIR | MMC | SPI | SD | EMMC | USB | PCIE | SATA | 1394 |
|---|---|---|---|---|---|---|---|---|---|
| 1 | I/O |  | CS |  | D- | D- | PETn | A- | TPA* |
| 2 | I/O | CMD | DIN | CMD | CMD |  | PETp | A+ | TPA |
| 3 | GND | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD |
| 5 | I | CLK | CLK | CLK | CLK |  | PERn | B- | TPB* |
| 6 | GND | VSS2 | VSS2 | VSS2 | VSS2 |  | VSS2 | VSS2 | VSS2 |
| 7 | I/O | DAT0 | DOUT | DAT0 | D+ | D+ | PERp | B+ | TPA* |

FIG. 11A

| PIN | DIR | MMC | SPI | SD | EMMC | USB | PCIE | SATA | 1394 |
|---|---|---|---|---|---|---|---|---|---|
| 1 | I/O | CS | CS | CS | D- | D- | PETn | A- | TPA* |
| 2 | I/O | CMD | DIN | CMD | CMD | CMD | PETp | A+ | TPA |
| 3 | GND | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD |
| 5 | I | CLK | CLK | CLK | CLK | CLK | PERn | B- | TPB* |
| 6 | GND | VSS2 | VSS2 | VSS2 | VSS2 | VSS2 | VSS2 | VSS2 | VSS2 |
| 7 | I/O | DAT0 | DOUT | DAT0 | D+ | D+ | PERp | B+ | TPA* |

FIG. 11B

| PIN | DIR | MMC | SPI | SD | EMMC | USB | EUSB | EUSB4 | PCIE | SATA | 1394 |
|---|---|---|---|---|---|---|---|---|---|---|---|
| 1 | I/O | DAT3 | CS | DAT3 | | | D1- | D1- | PETn | A- | TPA* |
| 2 | I/O | CMD | DIN | CMD | CMD | | CMD | CMD | PETp | A+ | TPA |
| 3 | GND | VSS1 | VSS1 | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD | VDD | VDD |
| 5 | I | CLK | CLK | CLK | CLK | | CLK | CLK | REFCLK+ | | |
| 6 | GND | VSS2 | VSS2 | VSS2 | VSS2 | | VSS2 | VSS2 | VSS2 | VSS2 | VSS2 |
| 7 | I/O | DAT0 | DOUT | DAT0 | | | D+ | D+ | REFCLK- | | |
| 8 | I/O | DAT1 | | DAT1 | | | D- | D- | PERp | B+ | TPB |
| 9 | I/O | DAT2 | | DAT2 | | | D1+ | D1+ | PERn | B- | TPB* |
| 10 | I/O | DAT4 | | DAT4 | | | | D2+ | PERST# | | |
| 11 | I/O | DAT5 | | DAT5 | | | | D2- | CLKREQ# | | |
| 12 | I/O | DAT6 | | DAT6 | D+ | D+ | | D3+ | WAKE# | | |
| 13 | I/O | DAT7 | | DAT7 | D- | D- | | D3- | | | |

FIG. 12A

| PIN | DIR | MMC | SPI | SD | EMMC | USB | EUSB | EUSB4 | PCIE | SATA | 1394 |
|---|---|---|---|---|---|---|---|---|---|---|---|
| 1 | I/O | DAT3 | CS | DAT3 | DAT3 | DAT3 | D1- | D1- | PETn | A- | TPA* |
| 2 | I/O | CMD | DIN | CMD | CMD | CMD | CMD | CMD | PETp | A+ | TPA |
| 3 | GND | VSS1 | VSS1 | VSS1 | VSS1 | VSS1 | VSS1 | VSS1 | VSS1 | VSS1 | VSS1 |
| 4 | PWR | VDD | VDD | VDD | VDD | VDD | VDD | VDD | VDD | VDD | VDD |
| 5 | I | CLK | CLK | CLK | CLK | CLK | CLK | CLK | REFCLK+ | CLK | CLK |
| 6 | GND | VSS2 | VSS2 | VSS2 | VSS2 | VSS2 | VSS2 | VSS2 | VSS2 | VSS2 | VSS2 |
| 7 | I/O | DAT0 | DOUT | DAT0 | DAT0 | DAT0 | D+ | D+ | REFCLK- | DAT0 | DAT0 |
| 8 | I/O | DAT1 | DAT1 | DAT1 | DAT1 | DAT1 | D- | D- | PERp | B+ | TPB |
| 9 | I/O | DAT2 | DAT2 | DAT2 | DAT2 | DAT2 | D1+ | D1+ | PERn | B- | TPB* |
| 10 | I/O | DAT4 | DAT4 | DAT4 | DAT4 | DAT4 | DAT4 | D2+ | PERST# | DAT4 | DAT4 |
| 11 | I/O | DAT5 | DAT5 | DAT5 | DAT5 | DAT5 | DAT5 | D2- | CLKREQ# | DAT5 | DAT5 |
| 12 | I/O | DAT6 | DAT6 | DAT6 | D+ | D+ | DAT6 | D3+ | WAKE# | DAT6 | DAT6 |
| 13 | I/O | DAT7 | DAT7 | DAT7 | D- | D- | DAT7 | D3- | DAT7 | DAT7 | DAT7 |

FIG. 12B

| PIN | DIR | MEMORY STICK | MS PRO DUO | EMS | USB | EUSB | PCIE | SATA | 1394 |
|---|---|---|---|---|---|---|---|---|---|
| 1 | GND | VSS | VSS | VSS | VSS | VSS | VSS | VSS | VSS |
| 2 | — | BS | BS | BS | | | REFCLK- | | |
| 3 | | VCC | DAT1 | VCC | | D- | PETn | T- | TPA* |
| 4 | I/O | DAT0 | DAT0 | DAT0 | D+ | D1+ | PETp | T+ | TPA |
| 5 | I/O | | DAT2 | D+ | | D+ | | | TPB* |
| 6 | O | INS | INS | INS | D- | D- | PERn | R- | |
| 7 | I/O | DAT3 | DAT3 | D- | | | PERp | R+ | TPB |
| 8 | — | SCLK | SCLK | SCLK | | | REFCLK+ | | |
| 9 | PWR | VCC | VCC | VCC | VCC | VCC | VCC | VCC | VCC |
| 10 | GND | VSS | VSS | VSS | VSS | VSS | VSS | VSS | VSS |

FIG. 13A

| PIN | DIR | MEMORY STICK | MS PRO DUO | EMS | USB | EUSB | PCIE | SATA | 1394 |
|---|---|---|---|---|---|---|---|---|---|
| 1 | GND | VSS | VSS | VSS | VSS | VSS | VSS | VSS | VSS |
| 2 | — | BS | BS | BS | BS | BS | | BS | BS |
| 3 | | VCC | DAT1 | VCC | VCC | D- | REFCLK- | T- | TPA* |
| 4 | I/O | DAT0 | DAT0 | DAT0 | DAT0 | D1+ | PETn | T+ | TPA |
| 5 | I/O | DAT2 | DAT2 | D+ | D+ | D+ | PETp | R- | TPB* |
| 6 | O | INS | INS | INS | INS | INS | PERn | INS | INS |
| 7 | I/O | DAT3 | DAT3 | D- | D- | D- | PERp | R+ | TPB |
| 8 | — | SCLK | SCLK | SCLK | SCLK | SCLK | REFCLK+ | SCLK | SCLK |
| 9 | PWR | VCC | VCC | VCC | VCC | VCC | VCC | VCC | VCC |
| 10 | GND | VSS | VSS | VSS | VSS | VSS | VSS | VSS | VSS |

FIG. 13B

| PIN | DIR | MMC | SD | MMC/SMART CARD | USB/SMART CARD |
|---|---|---|---|---|---|
| 1 | I/O | DAT3 | DAT3 | VPP | DAT3 |
| 2 | I/O | CMD | CMD | CMD | RST |
| 3 | GND | VSS1 | VSS1 | VSS1 | VSS1 |
| 4 | PWR | VDD | VDD | VDD | VDD |
| 5 | I | CLK | CLK | CLK | CLK |
| 6 | GND | VSS2 | VSS2 | VSS2 | VSS2 |
| 7 | I/O | DAT0 | DAT0 | DAT0 | I/O |
| 8 | I/O | DAT1 | DAT1 | I/O | D+ |
| 9 | I/O | DAT2 | DAT2 | RST | D- |

FIG. 14

| PIN | DIR | MMC (13) | MMC(9)/SMART CARD | EMMC/SMART CARD | SD/SMART CARD | USB/SMART CARD | PCIE/SMART CARD |
|---|---|---|---|---|---|---|---|
| 1 | I/O | DAT3 | DAT3 | | DAT3 | | PETn |
| 2 | I/O | CMD | CMD | CMD | CMD | | PETp |
| 3 | GND | VSS1 | VSS1 | VSS1 | VSS1 | VSS1 | VSS1 |
| 4 | PWR | VDD | VDD | VDD | VDD | VDD | VDD |
| 5 | I | CLK | CLK | CLK | CLK | | REFCLK+ |
| 6 | GND | VSS2 | VSS2 | VSS2 | VSS2 | VSS2 | VSS2 |
| 7 | I/O | DAT0 | DAT0 | | DAT0 | | REFCLK- |
| 8 | I/O | DAT1 | DAT1 | D+ | DAT1 | D+ | PERp |
| 9 | I/O | DAT2 | DAT2 | D- | DAT2 | D- | PERn |
| 10 | I/O | DAT4 | VPP | VPP | VPP | VPP | VPP |
| 11 | I/O | DAT5 | RST | RST | RST | RST | RST |
| 12 | I/O | DAT6 | CLK | CLK | CLK | CLK | CLK |
| 13 | I/O | DAT7 | I/O | I/O | I/O | I/O | I/O |

FIG. 15(A)

| PIN | DIR | MMC (13) | MMC(9)/SMART CARD | EMMC/SMART CARD | SD/SMART CARD | USB/SMART CARD | PCIE/SMART CARD |
|---|---|---|---|---|---|---|---|
| 1 | I/O | DAT3 | DAT3 | DAT3 | DAT3 | DAT3 | PETn |
| 2 | I/O | CMD | CMD | CMD | CMD | CMD | PETp |
| 3 | GND | VSS1 | VSS1 | VSS1 | VSS1 | VSS1 | VSS1 |
| 4 | PWR | VDD | VDD | VDD | VDD | VDD | VDD |
| 5 | I | CLK | CLK | CLK | CLK | CLK | REFCLK+ |
| 6 | GND | VSS2 | VSS2 | VSS2 | VSS2 | VSS2 | VSS2 |
| 7 | I/O | DAT0 | DAT0 | DAT0 | DAT0 | DAT0 | REFCLK- |
| 8 | I/O | DAT1 | DAT1 | D+ | DAT1 | D+ | PERp |
| 9 | I/O | DAT2 | DAT2 | D- | DAT2 | D- | PERn |
| 10 | I/O | DAT4 | VPP | VPP | VPP | VPP | VPP |
| 11 | I/O | DAT5 | RST | RST | RST | RST | RST |
| 12 | I/O | DAT6 | CLK | CLK | CLK | CLK | CLK |
| 13 | I/O | DAT7 | I/O | I/O | I/O | I/O | I/O |

FIG. 15(B)

EXTENDED SECURE-DIGITAL (SD) DEVICES AND HOSTS

The present invention is a divisional of a patent application entitled "Extended Secure-Digital (SD) Devices And Hosts" by inventors Horng-Yee Chou, Szu-Kuang Chou, Kuang-Yu Wang and I-Kang Yu, filing date May 25, 2004, U.S. Ser. No. 10/854,004 which is a continuation-in-part of a patent application entitled "Extended-Secure-Digital Interface Using A Second Protocol For Faster Transfers" by inventors Horng-Yee Chou, Szu-Kuang Chou, and Charles C. Lee, filing date Mar. 16, 2004, U.S. Ser. No. 10/708,634, now issued as U.S. Pat. No. 7,069,369.

BACKGROUND OF THE INVENTION

This invention relates to removable-card interfaces, and more particularly to dual-protocol interfaces for removable cards.

Flash-memory cards are widely used for storing digital pictures captured by digital cameras. One useful format is Sony's Memory Stick (MS), having a small form factor roughly the size of a stick of chewing gum. Another highly popular format is Secure-Digital (SD), which is an extension of the earlier MultiMediaCard (MMC) format. SD cards are relatively thin, having an area roughly the size of a large postage stamp.

SD cards are also useful as add-on memory cards for other devices, such as portable music players, personal digital assistants (PDAs), and even notebook computers. SD cards are hot-swappable, allowing the user to easily insert and remove SD cards without rebooting or cycling power. Since the SD cards are small, durable, and removable, data files can easily be transported among electronic devices by being copied to an SD card. SD cards are not limited to flash-memory cards. Other applications such as communications transceivers can be implemented as SD cards.

The SD interface currently supports a top transfer rate of 100 Mb/s, which is sufficient for many applications. However, some applications such as storage and transport of full-motion video may benefit from higher transfer rates.

Other bus interfaces offer higher transfer rates. Universal-Serial-Bus (USB), for example, has a top transfer rate of 480 Mb/s. Peripheral-Component-Interconnect (PCI) Express, at 2.5 Gb/s, and Serial-Advanced-Technology-Attachment (SATA), at 1.5 Gb/s and 3.0 Gb/s, are two examples of high-speed serial bus interfaces for next generation devices. IEEE 1394 (Firewire) supports 3.2 Gb/s. Serial Attached Small-Computer System Interface (SCSI) supports 1.5 Gb/s. These are roughly 5 to 32 times faster than the SD interface.

A new removable-card form-factor known as ExpressCard has been developed by Personal-Computer Memory Card International Association (PCMCIA), PCI, and USB standards groups. ExpressCard is about 75 mm long, 34 mm wide, and 5 mm thick and has an ExpressCard connector. ExpressCard provides both USB and PCI Express interfaces on the same 26-pin card connector.

Serial-ATA is used mostly as an internal expansion interface on PC's, since it requires two separate connectors. A first 7-pin connector carries signals while a second 15-pin connector is for power. ExpressCard's large 26-pin connector limits its usefulness and increases the physical size of devices using ExpressCard connectors. Compact-Flash cards also tend to be larger in size than SD cards since the Compact-Flash protocol typically involves more connector pins.

SD and MMC are complementary card interfaces, and are sometimes lumped together and referred to as SD/MMC cards. The older MMC cards have 7 metal connector pads while SD has 9 connector pads. MMC cards can fit in SD slots. However, the host must determine which type of card is inserted into its slot for proper communication. When a 7-pin MMC card is inserted, only 7 pads are used, while the additional 2 pads are used when a SD card is detected in the slot.

FIG. 1 shows a prior-art implementation for the card-detection routine executed by a host. The host, such as a host personal computer (PC) detects when a card is inserted into a slot, step 102. The host sends a sequence of commands to the inserted card that includes a CMD55 command, step 104. If the card does not respond properly to the CMD55 command, step 106, then the card is deemed an MMC card, not a SD card. A sequence of commands is sent to the MMC card, step 108, which includes the CMD1 command. The MMC card is then initialized by a sequence of commands, such as the host reading configuration registers on the MMC card, step 110. The host uses the 7 pins shared with MMC to communicate with the MMC card.

When the inserted card responds to the CMD 55 command, step 106, then the card may be a SD card. Further commands are sent to the card including the advanced command ACMD41, step 112. If the card does not respond properly to the ACMD41, step 114, then the card fails, step 116.

When the card responds properly to the ACMD41, step 112, then the card is deemed an SD memory card. The SD card is then initialized by a sequence of commands, such as the host reading configuration registers on the SD card, step 118. The host uses the 9-pin SD interface to communicate with the SD card. The host can use one data line or up to four data lines in the SD interface for communication. Data stored on the SD card can be encrypted using higher-level security protocols.

FIG. 2 is a flowchart illustrating a prior-art implementation of a detection-response routine executed by a SD memory card. The SD card obtains power from the metal contact pads when inserted into the host slot and powers up, step 202. A card-initialization routine is started, step 204, which may include various internal self-checks. A controller inside the SD card executes these routines, activates the external interface, and then waits for commands from the host. When a CMD55 is received from the host, step 206, then the SD controller waits for an ACMD41 from the host, step 208. The card responds to the ACMD41 from the host with Operation Conditions Register content, step 210. The SD card is then ready to receive further commands from the host, step 212. The full 9-pin SD interface is used.

While either MMC or SD cards can be detected, the transfer rate using either MMC or SD cards is slower than many current bus standards. Applications such as video transfer could benefit from a higher-speed interface than a SD card. The thin, small size of the SD card is beneficial, but the slow transfer rates could limit SD-card use in the future. A higher-speed interface than the SD card is desired, as is a detection scheme for use with higher-speed interfaces.

SUMMARY OF THE INVENTION

The invention relates, in one embodiment, to a multi-protocol host configured to communicate with a device. The host includes a receptacle configured to be mechanically compatible with an industry-standard Secure Digital (SD) plug and a multi-protocol switch coupled to the receptacle. The host also includes a plurality of protocol processors coupled to the multi-protocol switch and a host processor coupled to the plurality of protocol processors, whereby the multi-protocol switch is configured to enable, responsive to a determination of a first protocol supported by the device, only one of the plurality of protocol processors to communicate with the host processor when the host is connected with the device, the one of the plurality of protocol processors supports the first protocol.

In another embodiment, the invention relates to a multi-protocol device configured to communicate with a host, which includes a plug configured to be mechanically compatible with an industry-standard Secure Digital (SD) receptacle and a multi-protocol switch coupled to the receptacle. The device includes a plurality of protocol processors coupled to the multi-protocol switch and a device processor coupled to the plurality of protocol processors, whereby the multi-protocol switch is configured to enable, responsive to a determination of a first protocol supported by the host, only one of the plurality of protocol processors to communicate with the device processor when the device is coupled with the host, the one of the plurality of protocol processors supports the first protocol.

In yet another embodiment, the invention relates to a method, in a multi-protocol device configured to communicate with a host using a plug that is configured to be mechanically-compatible with an industry-standard Secure Digital (SD) receptacle, for initializing the device for communication with the host. The method includes ascertaining whether the device is a multi-protocol device. If the device is a multi-protocol device, the method includes performing steps a) through c) as follows a) receiving a CMD 55 command from the host, b) thereafter, receiving a subsequent command from the host, and c) if the subsequent command is ACMD1, responding to the host with a protocol list that specifies protocols supported by the device.

In yet another embodiment, the invention relates to a method, in a host configured to communicate with a device using a receptacle that is configured to be mechanically compatible with an industry-standard Secure Digital (SD) plug, for initializing the host for communication with the host. The method includes transmitting using a SD protocol a CMD55 command from the host to the device. If the device responds to the CMD55 command, the method includes transmitting, using the SD protocol, a VSD-identifying command from the host to the device. If the device responds to the VSD-identifying command, the method includes obtaining a personality data from the device, the personality data including data regarding protocols other than the SD protocol that are supported by the device, and communicating with the device using a first protocol, the first protocol representing a protocol identified by the personality data and supported by the multi-protocol host.

In yet another embodiment, the invention relates to a method, in a device configured to communicate with a host using a plug that is configured to be mechanically compatible with an industry-standard Secure Digital (SD) receptacle, for preparing the device for communication with the host. The method includes initializing the device to ready the device for accepting a command from the host and receiving the command from the host. The method also includes ascertaining whether the command is received in a first protocol supported by the device, the first protocol representing a protocol other than a SD protocol. The method additionally includes executing the command if the command is associated with the first protocol.

In yet another embodiment, the invention relates to a method, in a host configured to communicate with a device using a receptacle that is configured to be mechanically compatible with an industry-standard Secure Digital (SD) plug, for initializing the host for communication with the host. The method includes a) starting a timer, and b) sending a device inquiry command from the host to the device using the highest priority protocol in a set of protocols supported by the host. If the device does not respond to the device inquiry and the set of protocols has not been exhausted, considering the next highest priority protocol in the set of protocols the highest priority protocol, and returning to the step c) to send the device inquiry command. The method also includes d) if the device responds to the inquiry, interrupting a CPU associated with the host to send device status information received from the device to the CPU and loading a device driver configured to enable the host to communicate with the device using a first protocol, the first protocol representing a protocol with which the device responds to the device inquiry command.

BRIEF DESCRIPTION OF THE DRAWINGS

FIGS. 10A and 10B are tables showing, in accordance with embodiments of the present invention, signal multiplexing with a 9-pin SD connector. "A" portion is represented with the minimum signals that support the specified protocol. "B" portion is represented with the default values for the unused signals.

FIGS. 11A and 11B are tables showing, in accordance with embodiments of the present invention, signal multiplexing with a 7-pin MMC connector. "A" portion is represented with the minimum signals that support the specified protocol. "B" portion is represented with the default values for the unused signals.

FIGS. 12A and 12B are tables showing, in accordance with embodiments of the present invention, pin multiplexing for an extended 13-pin connector. "A" portion is represented with the minimum signals that support the specified protocol. "B" portion is represented with the default values for the unused signals.

FIGS. 13A and 13B are tables showing, in accordance with embodiments of the present invention, pin multiplexing for a 10-pin Memory Stick system.

FIG. 14 is a table showing, in accordance with an embodiment of the present invention, signal multiplexing with a 9-pin MMC connector.

FIGS. 15A and 15B are tables showing, in accordance with embodiments of the present invention, signal multiplexing with a 13-pin MMC connector. "A" portion is represented with the minimum signals that support the specified protocol. "B" portion is represented with the default values for the unused signals.

DETAILED DESCRIPTION OF PREFERRED EMBODIMENTS

Figure 1:
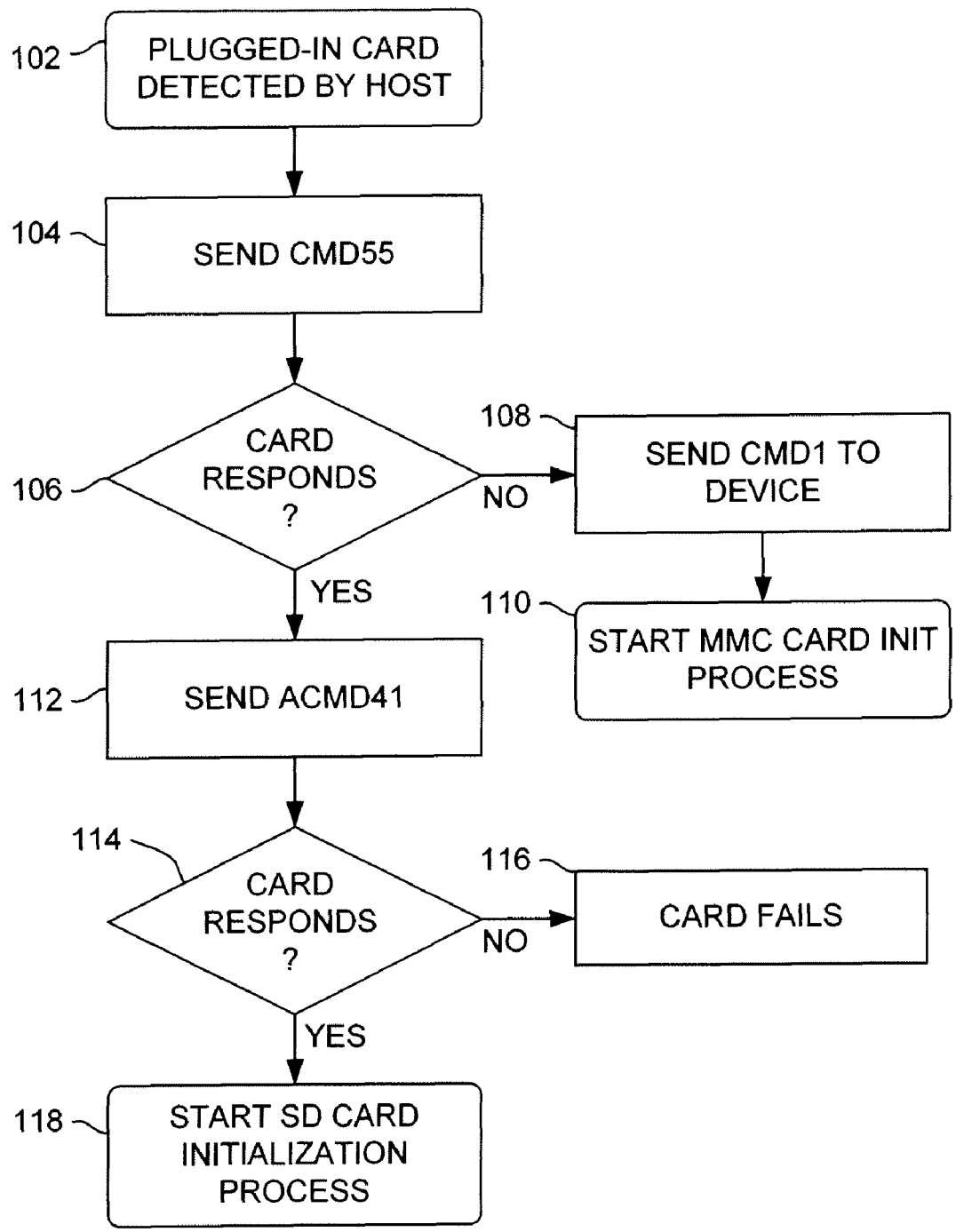
FIG. 1 shows a prior-art card-detection routine executed by a host.
Figure 2:
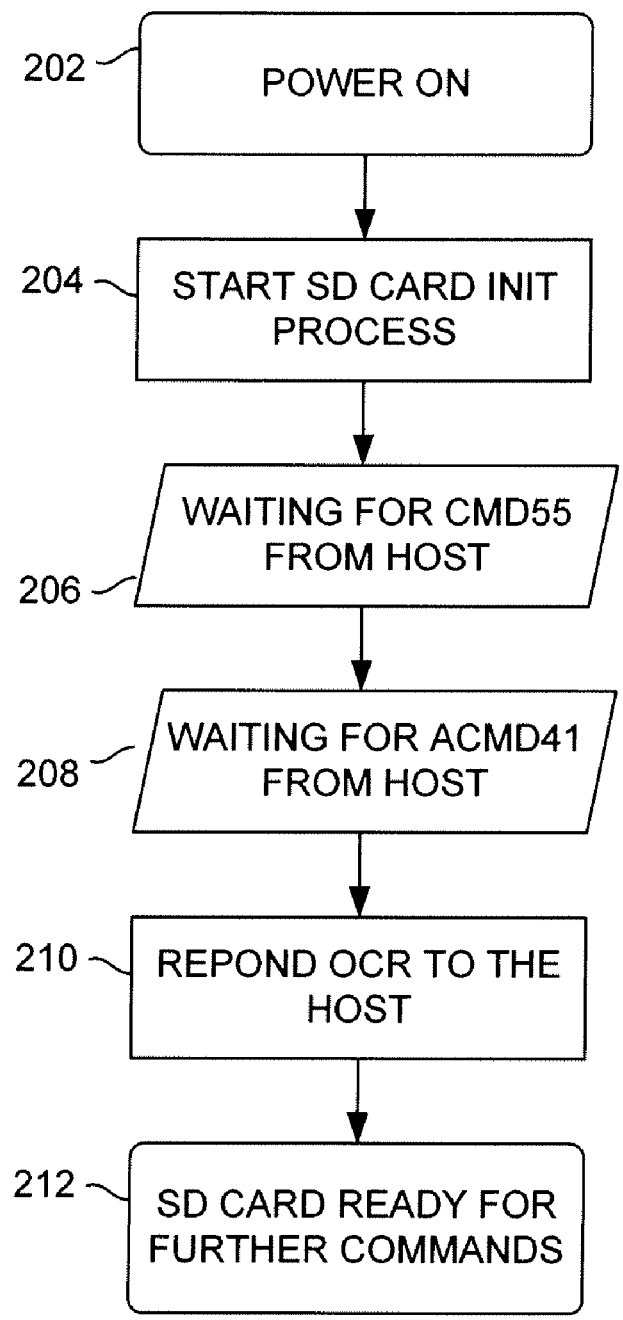
FIG. 2 is a flowchart of a prior-art detection-response routine executed by a SD card.

The present invention relates to an improvement in insertable cards and interfaces therefor. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that the existing physical and electrical specifications for the SD card can be employed, with inventive adaptations, to support higher-speed transfers. More specifically, in an embodiment, the signals from the 9-pin SD-card interface can be multiplexed to protocol processors for other interfaces that support higher-speed transfers, such as USB, IEEE 1394, SATA, SAS, PCI-Express, etc. Thus data transfers can occur using higher-bandwidth protocols with the existing physical SD pins.

The invention can include a multi-personality host and/or multi-personality card and/or single-personality host and/or single-personality card and/or a system comprising a combination thereof. The application combinations may include, for example, a multi-personality host and a multi-personality device, a multi-personality host and a single-personality device, a single-personality host and a multi-personality device, and a single-personality host and a single-personality device.

An SD card modified to use a higher-speed serial bus is referred herein as a very-high-speed SD card, or a VSD card. A host that can communicate with a VSD card is a referred to herein as a VSD host. A VSD card can act as a SD card when inserted into a legacy SD host. Furthermore, a VSD host can read SD or MMC cards. Thus the VSD card and VSD host are backward compatible.

A VSD card has, in an embodiment, the same arrangement of the 9 metal pads as a SD card, but may contain an internal buffer switch that can couple an internal serial-bus protocol processor instead of the normal SD protocol processor to the metal pads. For example, a USB protocol processor inside VSD card can be coupled, using the aforementioned internal switch, to some of the metal pads when a VSD card is operating in VSD mode.

A VSD card may be multi-mode (i.e., it has multiple processors supporting multiple protocols) or it may be single-mode. A single-mode VSD card has a plug that is mechanically compatible with a SD receptacle but employs a single protocol processor, other than the SD protocol processor, to support a protocol other than SD. In a single-mode VSD card, the aforementioned internal switch is not necessary.

For many reasons, one may wish to employ a protocol other than SD in a card that is mechanically compatible with a SD receptacle. For example, the advantage of using USB functional and electrical protocol includes reduced pins, higher speed, reduced power and less conversion circuitry for USB card reader host. The reason for power reduction is because of the reduced voltage swing (about 400 mv) needed for reliable communication.

The present VSD approach can be used in portable and notebook computers, desktop computers, PDAs, Pocket PCs, handy terminals, personal communicators, set-top boxes, digital cameras, cellular phones with/without digital camera, electronic devices, etc. The VSD approach is highly advantageous when employed for the flash memory cards but is not limited to such application.

Figure 3:
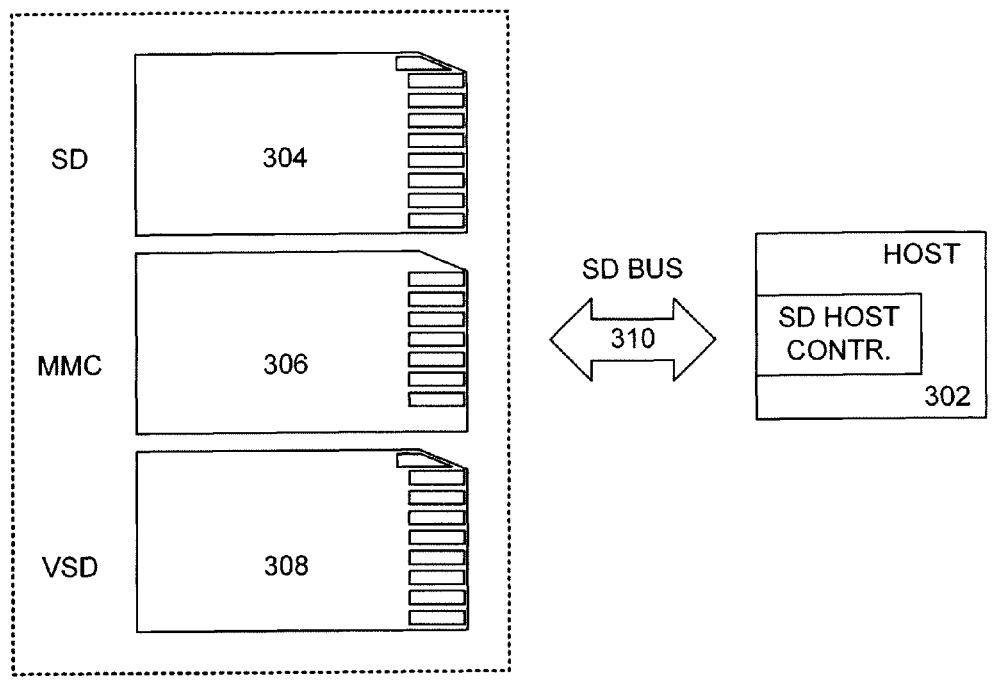
FIG. 3 shows, in accordance with an embodiment of the present invention, a SD host accepting a MMC card, a SD card, or a Very-high-speed-Secure-Digital (VSD) card.

FIG. 3 shows, in accordance with an embodiment of the present invention, a SD host accepting a MMC card, a SD card, or a VSD card. Host 302 is a legacy SD host that can detect and accept SD card 304 or MMC card 306. When VSD card 308 is inserted, the SD host controller on host 302 detects a SD card and configures VSD card 308 to operate as a SD card over the normal 9-pin SD interface and SD bus 310.

MMC card 306 has only 7 metal pads and uses 2 fewer of the lines on SD bus 310 than does SD card 304. SD card 304 has two extra metal pads that are not present on MMC card 306. In an embodiment, one extra metal pad is added near the beveled corner of SD card 304, while another extra pad is added on the other side of the 7 metal pads. VSD card 308 has the same arrangement of the 9 metal pads as SD card 304, and can communicate over SD bus 310 with host 302 using the standard SD interface and protocol.

Figure 4:
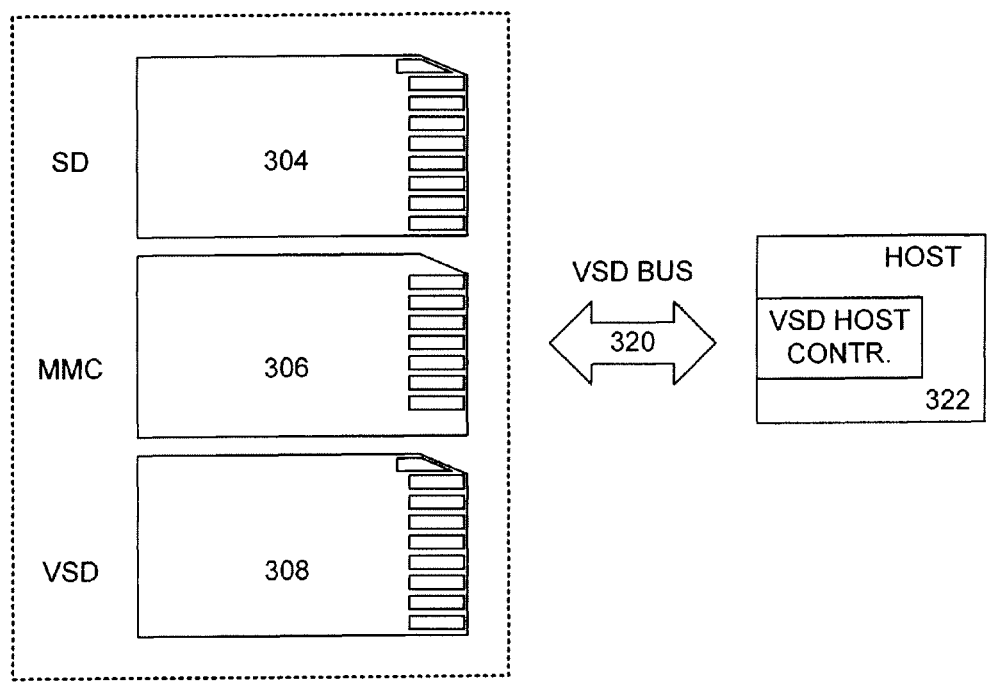
FIG. 4 shows, in accordance with an embodiment of the present invention, a VSD host accepting a MMC card, a SD card, or a VSD card.

FIG. 4 shows, in accordance with an embodiment of the present invention, a VSD host accepting a MMC card, a SD card, or a VSD card. Extended host 322 is a VSD host that can detect and accept SD card 304 or MMC card 306 or VSD card 308. When MMC card 306 is inserted, extended host 322 uses 7 pins of VSD bus 320 to communicate using the MMC pins and protocol. When SD card 304 is inserted, extended host 322 uses 9 pins of VSD bus 320 to communicate using the SD pins and protocol.

When VSD card 308 is inserted, the host controller on extended host 322 detects a VSD card and configures VSD card 308 to operate in extended mode using a high-speed serial-bus standard such as USB over VSD bus 320. Higher-bandwidth data transfers can then occur over VSD bus 320 using one of the serial-bus standards, such as USB, IEEE 1394, SATA, SAS or PCI-Express.

Figure 5A:
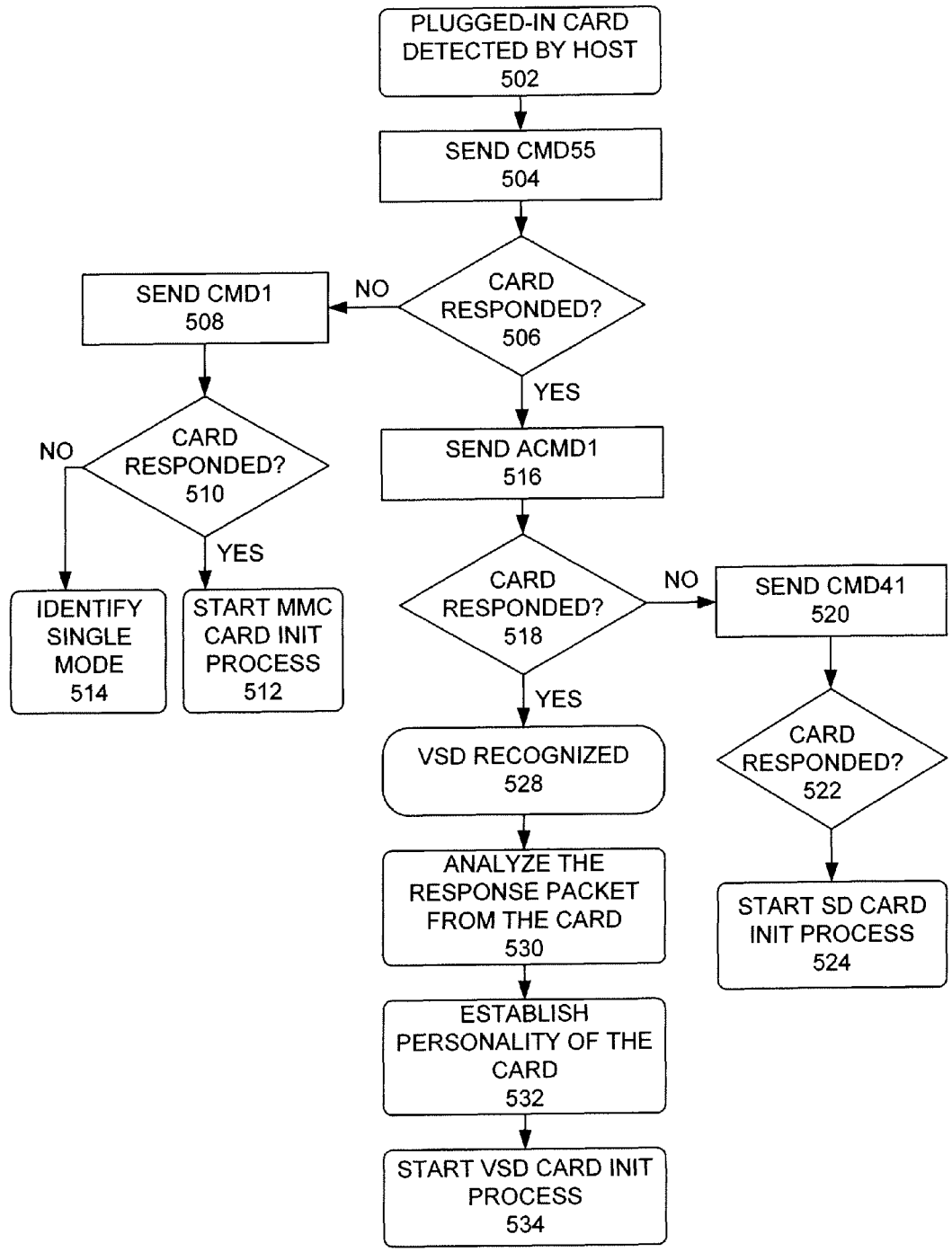
FIG. 5A is a flowchart illustrating, in accordance with an embodiment of the present invention, an VSD card-detection routine executed by a VSD host.

FIG. 5A is a flowchart illustrating, in accordance with an embodiment of the present invention, an VSD card-detection routine executed by a VSD host. The host, such as a host personal computer (PC) detects when a card is inserted into a slot, step 502. The VSD host sends a sequence of commands to the inserted card that includes a CMD55 command, step 504. If the card does not respond properly to the CMD55 command, step 506, then the card may be an MMC card, or a single-mode VSD card.

The reader should recall that a single-mode VSD card is a card capable of communication using a single protocol that is not the SD protocol. Further, a single-mode VSD card employs a plug that is mechanically compatible and pin-compatible with a SD receptacle. An exemplar single-mode VSD card is shown in FIG. 8B. Further, the fact that the card does not respond properly to the CMD55 command indicates that it is not a SD or a multi-mode VSD card.

A sequence of commands is then sent to the card, step 508, including the CMD1 command. If card responds properly to the CMD1 command (step 510), then the card is an MMC card. The MMC card is then initialized by a sequence of commands, such as the host reading configuration registers on the MMC card, step 512. The host uses the 7 pins shared with MMC to communicate with the MMC card. If the card does not respond properly, the host may try to communicate with the card by switching to a different single mode, step 514.

When the inserted card responds to the CMD55 command, step 506, then the card may be a multi-mode VSD card or a SD card. Further commands are sent to the card including the advanced VSD command ACMD1, step 516. Note that ACMD1 is a specially defined VSD-identifying command that only a multi-mode VSD card responds to in the expected manner. For example, a multi-mode VSD card could respond with a unique code used only for VSD.

If the card does not respond properly to the ACMD1, step 518, then the card cannot be a multi-mode VSD card. The SD command sequence continues, sending from the host the ACMD41 command, step 520.

When the card responds properly to the CMD55 and ACMD41 commands, step 522, then the card is a SD card. The SD card is then initialized by a sequence of commands, such as the host reading configuration registers on the SD card, step 524. The host then uses the 9-pin SD interface to communicate with the SD card. The host can use one data line or up to four data lines in the SD interface for communication. Data stored on the SD card can be encrypted using higher-level security protocols.

When the card does not respond properly to the CMD55 and ACMD41 commands, step 522, then the card fails, step 526. In this case, additional steps may be taken to further identify the card or to respond to the failure.

When the card responds properly to the ACMD1, step 518, then the card is a multi-mode VSD card, step 528. The VSD host can analyze responses from the card from this and other commands, step 530, to establish the personality and capabilities of the VSD card, step 532. This includes, for example, determining the high-speed serial bus protocol supported via the VSD interface.

The multi-mode VSD card is then initialized by a sequence of commands, such as the host reading configuration registers on the multi-mode VSD card, step 534. One of the serial-bus protocol processors is activated and connected to some or all of the 9 metal pads of the VSD bus to allow for extended-mode data transfer.

Figure 5B:
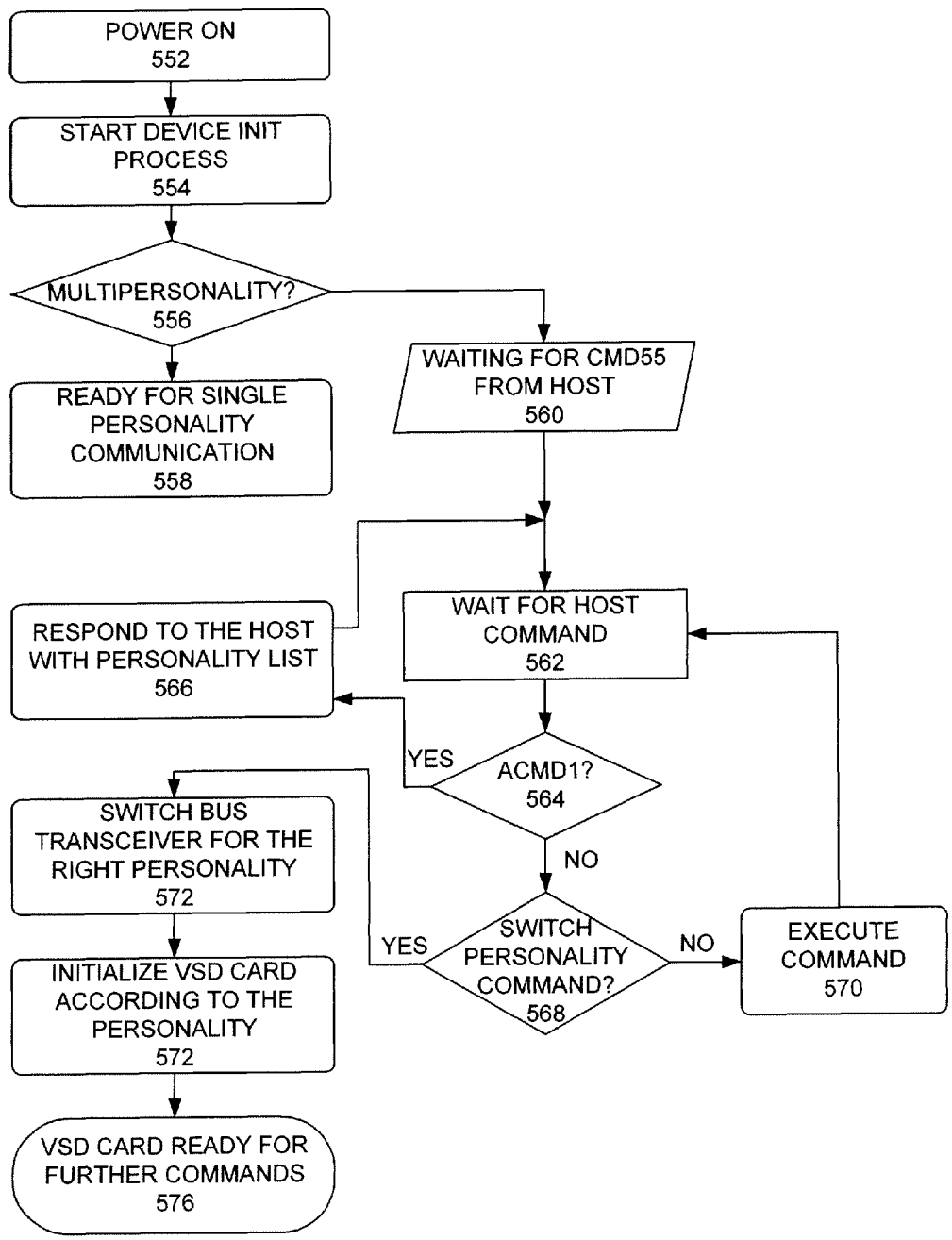
FIG. 5B is a flowchart illustrating, in accordance with an embodiment of the present invention, a VSD detection-response routine executed by a VSD card.

FIG. 5B is a flowchart illustrating, in accordance with an embodiment of the present invention, a VSD detection-response routine executed by a VSD card. In an embodiment, the VSD card obtains power from the metal contact pads when inserted into the host slot and powers up, step 552. A card-initialization routine is started, step 554, which may include various internal self-checks. A controller inside the VSD card executes these routines, activates the external interface, and then waits for commands from the host.

The controller ascertains whether it is capable of multi-mode or single-mode, step 556. If it is a single-mode VSD card, then the single-mode VSD card waits for the host to switch to the same mode to communicate, step 558.

If it is not a single-mode VSD card, then the multi-mode VSD card waits for the CMD55 command from host, step 560. When a CMD55 is received from the host, then the VSD controller waits for other commands from the host, step 562. If the ACMD1 command is received (564), the VSD card responds to the ACMD1 from the VSD host by listing all the available serial-bus protocols that the card supports, step 566. With this list available, the host may then choose a serial-bus protocol one of the available protocols that the host also supports in order to communicate with the multi-mode VSD card.

The card then waits for the next host command, step 562. For example, the host may send its chosen personality (i.e., communication protocol) to the multi-mode VSD card. If the command is the switch personality command (step 568), then the multi-mode VSD card will switch the bus transceiver to the protocol processor that supports the host's chosen personality, step 572.

The VSD card then initializes the selected protocol processor, step 574, and couples it to the appropriate pins on the SD connector. Thus, the card configures itself to connect one of its serial-bus protocol processors to some or all of the 9 SD pins. For example, USB may be supported and the USB protocol processors would be electrically coupled to communicate via some of the 9 SD pins. Once configuration is accomplished, the VSD card awaits further command from the host (step 576), e.g., application-related commands using one of the higher speed protocols supported.

If the command is not ACMD1 and not the switch personality command (steps 564 and 568), then the card just executes this command (step 570), and then waits for the next command.

Figure 6A:
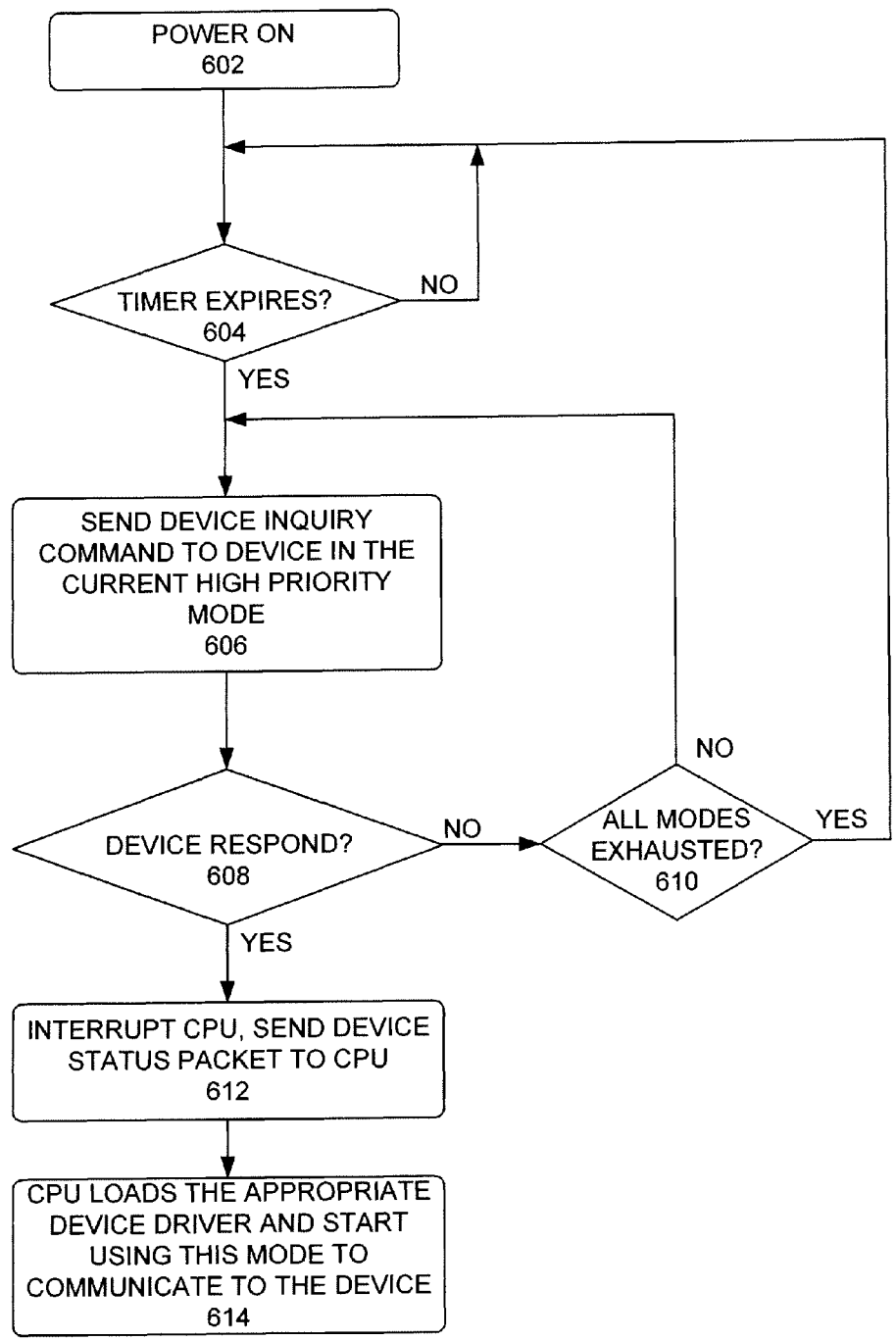
FIG. 6A is a flowchart illustrating, in accordance with an embodiment of the present invention, an alternative VSD card-detection routine executed by a host.

FIG. 6A is an alternative flowchart illustrating, in accordance with an embodiment of the present invention, an extended SD card-detection routine executed by a host. This flowchart is applicable to all hosts, including a single mode host (i.e., a host that supports only a single protocol) and a host without the native SD mode (i.e., a host that can supports multiple protocols but not the SD protocol, such as shown in FIG. 8B).

After power is turned on for the host computer, step 602, a timer is started. Step 604 waits for the timer to expire. After the timer expires, the host logic sends device inquiry command to the SD connector in the current high priority mode, step 606. If the device does not exist, or the device does not have this communication mode, the device will not respond (no in step 608). Then the host logic will switch to the mode that has the next priority and do this communication again (no in step 610). For example, there may be a list of modes arranged according to priority and the host logic will start with the highest priority mode and work its way down the list each time. Of course if the host is a single-mode host, the single mode will be the only mode, and that single mode is also the high priority mode at all times.

If all the modes supported by the host are exhausted (as determined in step 610) the routine will return and restart the timer and wait for the timer to expire again, step 604. Once the timer expires, it will attempt to establish communication all over again, starting with the default highest priority mode.

If the device does respond (yes for step 608), the host logic will interrupt the host CPU. The host logic will send the received device status packet to CPU, step 612. CPU will load the appropriate device driver and start using this mode to communicate to the device, step 614.

Figure 6B:
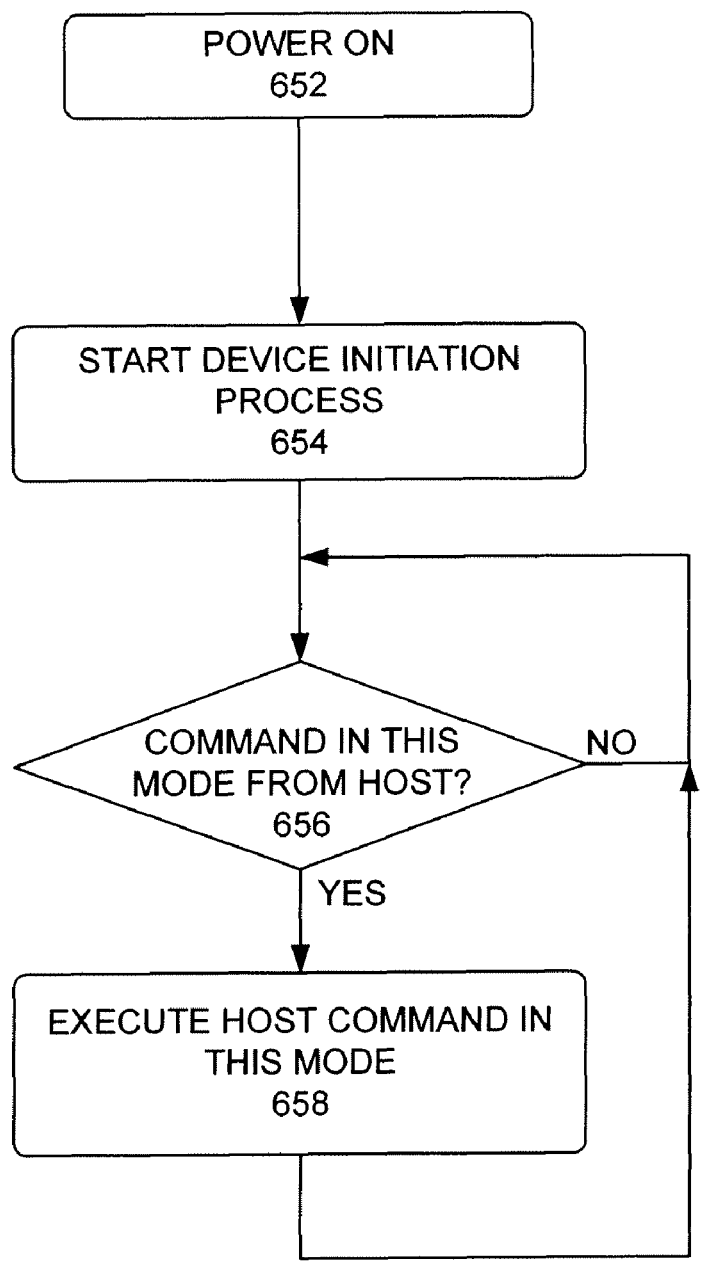
FIG. 6B illustrates, in accordance with an embodiment of the present invention, a power on sequence flowchart of a card that uses SD mechanical form factor but other serial electrical protocol.

FIG. 6B illustrates, in accordance with an embodiment of the present invention, a power on sequence flowchart of a single-mode VSD card, i.e., a card that uses SD mechanical form factor but other serial electrical protocol.

After the power is turned on for the device, step 652, the device will start its initialization process, step 654. Then it will wait for commands from host in this mode, step 656. If no recognizable command is received, it will continue to wait (conceptually shown by the loop back in the flowchart around step 656). When the card recognizes a command, the method will proceed to step 658 and execute this command After that, the method loops back to step 656 and wait for the next command. Thus, the VSD card initializes according to its only protocol. After initialization, the VSD card is then ready to receive further commands from the host.

If the host cannot communicate using the single protocol supported by the single-mode VSD card, then the single-mode VSD card will stay at step 656 since it will not receive a recognizable command to escape from the loop.

Figure 7A:
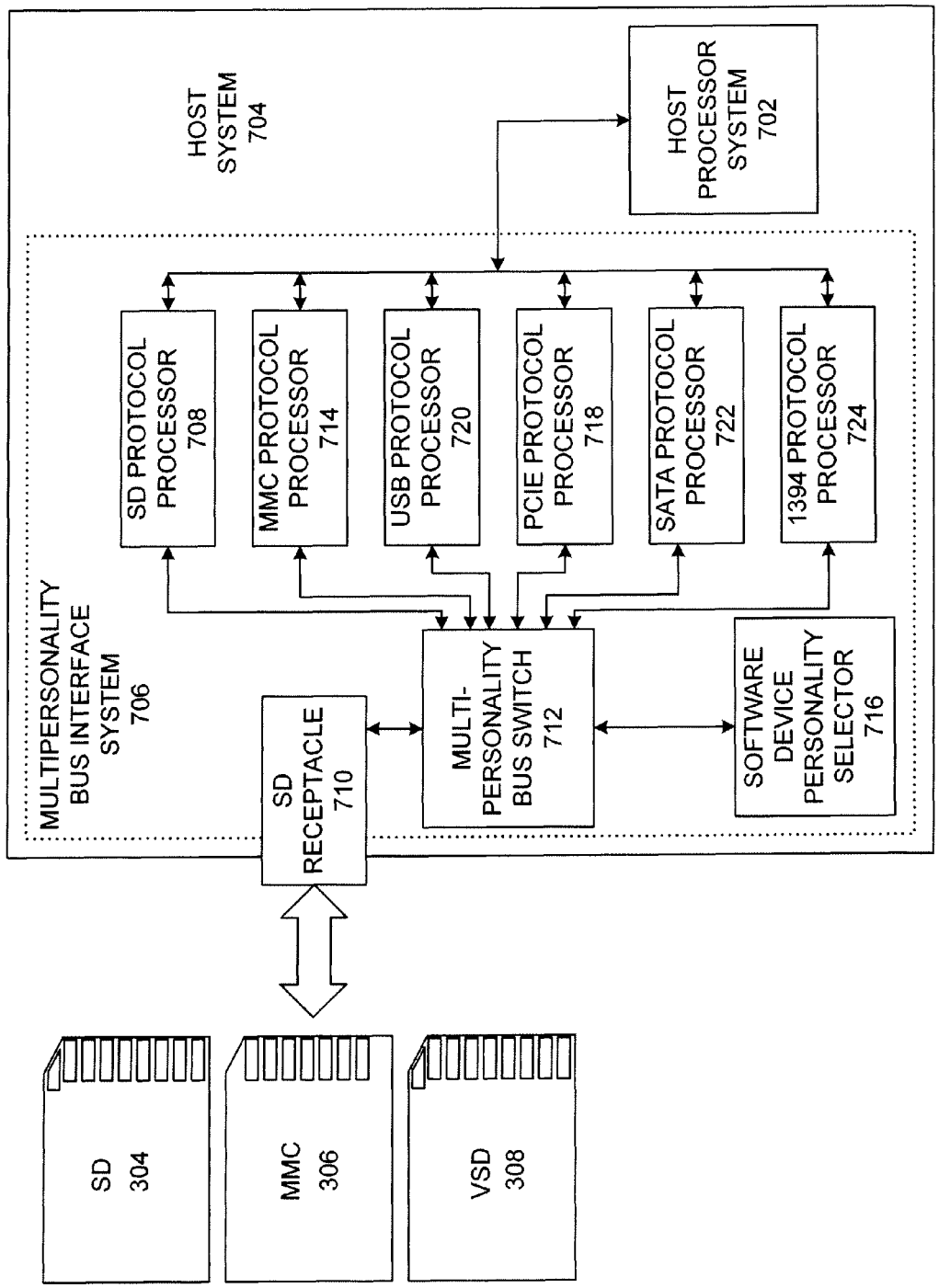
FIG. 7A illustrates, in accordance with an embodiment of the present invention, a block diagram of a host with an SD receptacle that supports extended-mode communication.

FIG. 7A is a block diagram illustrating, in accordance with an embodiment of the present invention, a host with a SD-compatible receptacle that supports extended-mode communication (i.e., communication using protocols that are in addition to or different from the SD protocol). SD card 304, MMC card 306, or VSD card 308 may be plugged into SD receptacle 710 of host 704. Each card can operate in its own communication mode. The flow chart to initialize the card is shown, in embodiments of the invention, in either FIG. 5A or 6A, depending on whether the card is multi-mode or single-mode.

Host 704 has processor system 702 for executing programs including card-management and bus-scheduling programs. Multi-personality bus interface 706 processes data from processor system 702 using various protocols. SD protocol processor 708 processes data using the SD protocol, and inputs and outputs data on the SD data lines in SD receptacle 710 through multi-personality bus switch 712. Other protocols communicate with SD receptacle 710 through multi-personality bus switch 712 also, which selects one of the available protocol processors in the host. The default setting of the multi-personality bus switch 712 is for SD, in an embodiment. In other embodiments, the default protocol may be one of the other protocols.

The contact pins in SD receptacle 710 connect to multi-personality bus switch 712. In an embodiment, transceivers in multi-personality bus switch 712 buffer data to and from the transmit and receive pairs of differential data lines in the metal contacts for all protocols including SD, USB, PCI-Express, IEEE 1394 Firewire, Serial-Attached SCSI, and Serial ATA, and for MultiMediaCard.

When an initialization routine executed by processor system 702 determines that the inserted card is an MMC card, MMC processor 714 is activated to communicate with MMC card 306 inserted into SD receptacle 710, while all other processors including SD processor 708 are disabled. Personality selector 716 configures multi-personality bus switch 712 to connect SD receptacle 710 to MMC processor 714 when processor system 702 determines that the inserted card is MMC.

When the inserted card is SD card 304, SD processor 708 continues to communicate with the card after initialization is complete.

When the initialization routine executed by processor system 702 determines that inserted card is VSD card 308, SD processor 708 continues to communicate with VSD card 308 until the capabilities of VSD card 308 are determined. Then one of the higher-speed serial-bus protocols is selected for use.

For example, when processor system 702 determines that VSD card 308 supports PCI-Express, personality selector 716 configures multi-personality bus switch 712 to connect SD receptacle 710 to PCI-Express processor 718. Then processor system 702 communicates with PCI-Express processor 718 instead of with SD processor 708.

When the initialization routine executed by processor system 702 determines that the inserted card is VSD card 308 and supports USB, personality selector 716 configures multi-personality bus switch 712 to connect SD receptacle 710 to USB processor 720. Then processor system 702 communicates with USB processor 720 instead of with SD processor 708.

Note that inside the host USB protocol processor 720, On The Go standard can be used. This is very useful for digital camera host. This scenario makes the USB protocol easily adapted as the communication protocol, replacing SD or MMC protocols.

When the initialization routine executed by processor system 702 determines that the inserted card is VSD card 308 that supports SATA, personality selector 716 configures multi-personality bus switch 712 to connect SD receptacle 710 to SATA processor 722. Then processor system 702 communicates with SATA processor 722 instead of with SD processor 708.

When the initialization routine executed by processor system 702 determines that the inserted card is VSD card 308 that supports 1394 Firewire, personality selector 716 configures multi-personality bus switch 712 to connect SD receptacle 710 to IEEE 1394 processor 66. Then processor system 702 communicates with IEEE 1394 processor 66 instead of with SD processor 708.

As mentioned, VSD card 308 may support more than one protocol. Processor system 702 can select from among the supported protocols. VSD host 704 may not support all protocols shown in FIG. 7, but may only support a subset. Furthermore, variations of the protocols shown may also be supported without departing from the scope and spirit of the present invention. Furthermore, other protocols other than those listed can also be supported using the same conceptual framework for device/host arrangement and communication initialization therebetween.

Figure 7B:
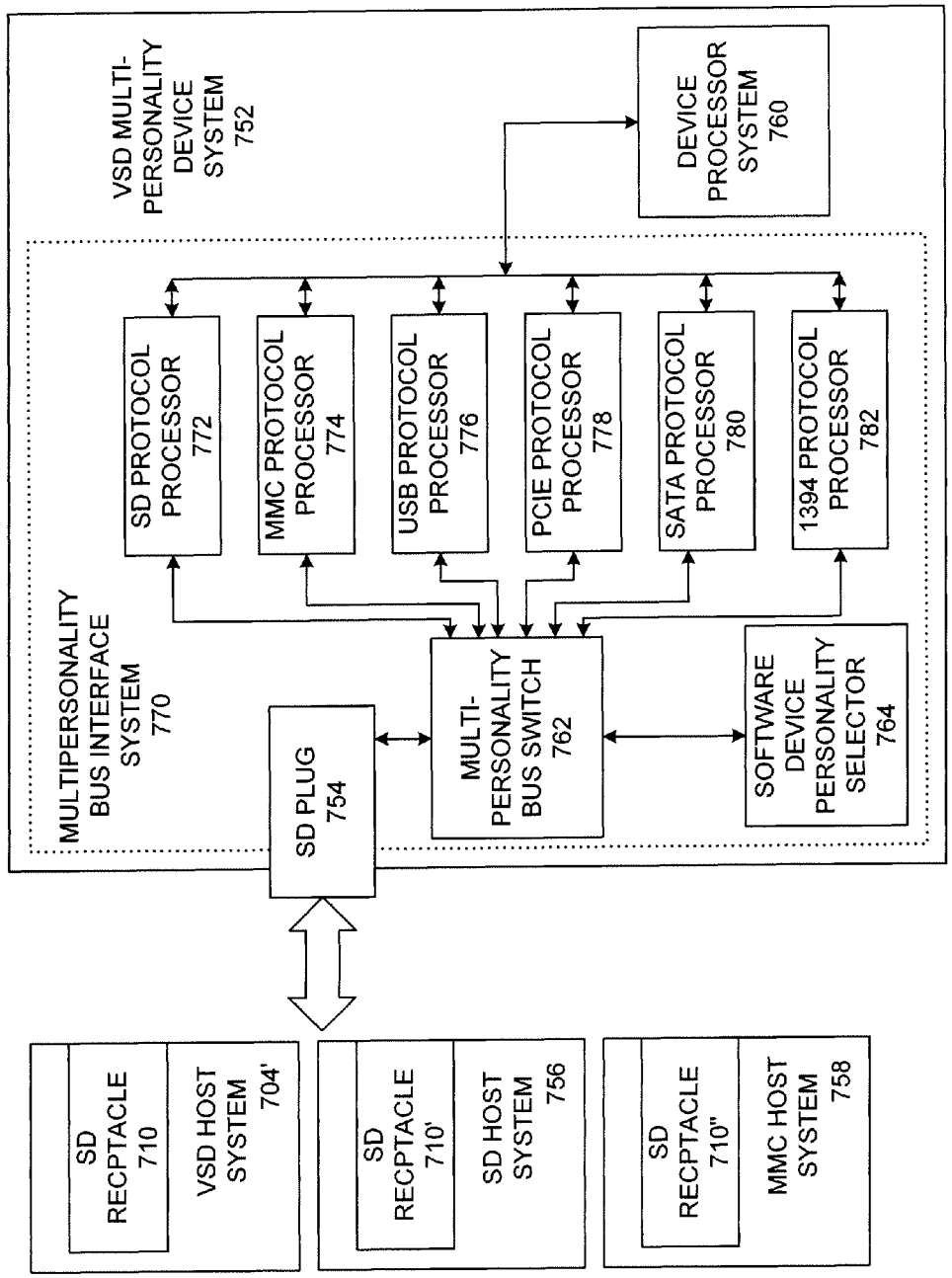
FIG. 7B illustrates, in accordance with an embodiment of the present invention, a block diagram of a VSD card device with an SD connector that supports VSD extended-mode communication.

FIG. 7B illustrates, in accordance with an embodiment of the present invention, a block diagram of a VSD card device with an SD-compatible connector plug that supports VSD extended-mode communication. VSD card device 752 may be VSD card 308 of FIG. 7A. Although six different protocol processors are shown in VSD card device 752, some VSD cards may have only a subset of these protocol processors or may include different protocol processors that support protocols not shown in FIG. 7A. VSD host 704' may be the same as VSD host 704 of FIG. 7A, or may have only a subset of all the protocol processors that VSD host 704 of FIG. 7A has, or may even support other protocols not shown in VSD host 704 of FIG. 7A.

SD plug 754 of VSD card device 752 may be plugged into SD receptacle 710 of VSD host 704'. SD plug 754 of VSD card device 752 could also be plugged into SD receptacle 710' of SD host 756, which does not support VSD mode, or SD plug 754 of VSD card device 752 may be plugged into MMC receptacle 710" of MMC host 758, which does not support VSD mode, but does support MMC mode.

Card device 752 has processor system 760 for executing programs including card-initialization and bus-response programs. Multi-personality bus interface 770 processes data from processor system 760 using various protocols. SD processor 772 processes data using the SD protocol, and inputs and outputs data on the SD data lines in SD plug 754 through multi-personality bus switch 762. Other protocol processors communicate with SD plug 754 through multi-personality bus switch 762, which selects one protocol processor.

The contact pins in SD plug 754 connect to multi-personality bus switch 762. Transceivers in multi-personality bus switch 762 move data to and from the transmit and receive pairs of differential data lines in the metal contacts for all protocols, including SD, PCI-Express, IEEE 1394 Firewire, Serial-Attached SCSI, and SATA, and for the older MultiMediaCard.

When an initialization routine executed by processor system 760 is commanded to use MMC-compatible SPI mode, when the host is MMC host 758, MMC processor 774 is activated to communicate with MMC host 758 connected to SD plug 754, while all other processors including SD processor 772 are disabled. Personality selector 764 configures multi-personality bus switch 762 to connect SD plug 754 to MMC processor 774 when processor system 760 is commanded to use MMC-compatible mode. When the host is SD host 756, SD processor 772 continues to communicate with SD host 756 after initialization is complete.

When the host initialization routine determines that both VSD card device 752 and VSD host 704' can support VSD mode, VSD host 704' sends a command through SD processor 772 to processor system 760 to switch to a specific advanced mode of VSD. Then one of the higher-speed serial-bus protocols is selected for use. For example, when processor system 760 is commanded to use PCI-Express, personality selector 764 configures multi-personality bus switch 762 to connect SD plug 754 to PCI-Express processor 778. Then processor system 760 communicates with PCI-Express processor 778 instead of with SD processor 772.

When the host initialization routine determines that the inserted card supports VSD with USB, processor system 760 is commanded to switch to USB mode. Personality selector 764 configures multi-personality bus switch 762 to connect SD plug 754 to USB processor 776. Then processor system 760 communicates with USB processor 776 instead of with SD processor 772.

When the host initialization routine determines that the inserted card supports VSD with SATA, processor system 760 is commanded to switch to SATA mode. Personality selector 764 configures multi-personality bus switch 762 to connect SD plug 754 to SATA processor 780. Then processor system 760 communicates with SATA processor 780 instead of with SD processor 772.

When the host initialization routine determines that the inserted card supports VSD with 1394 Firewire, processor system 760 is commanded to switch to 1394 Firewire mode. Personality selector 764 configures multi-personality bus switch 762 to connect SD plug 754 to IEEE 1394 processor 782. Then processor system 760 communicates with IEEE 1394 processor 782 instead of with SD processor 772.

As mentioned, VSD card device 752 may not support all protocols shown in FIGS. 7A and 7B, but may only support a subset. Some of protocol processors may be absent in some embodiments.

Figure 8A:
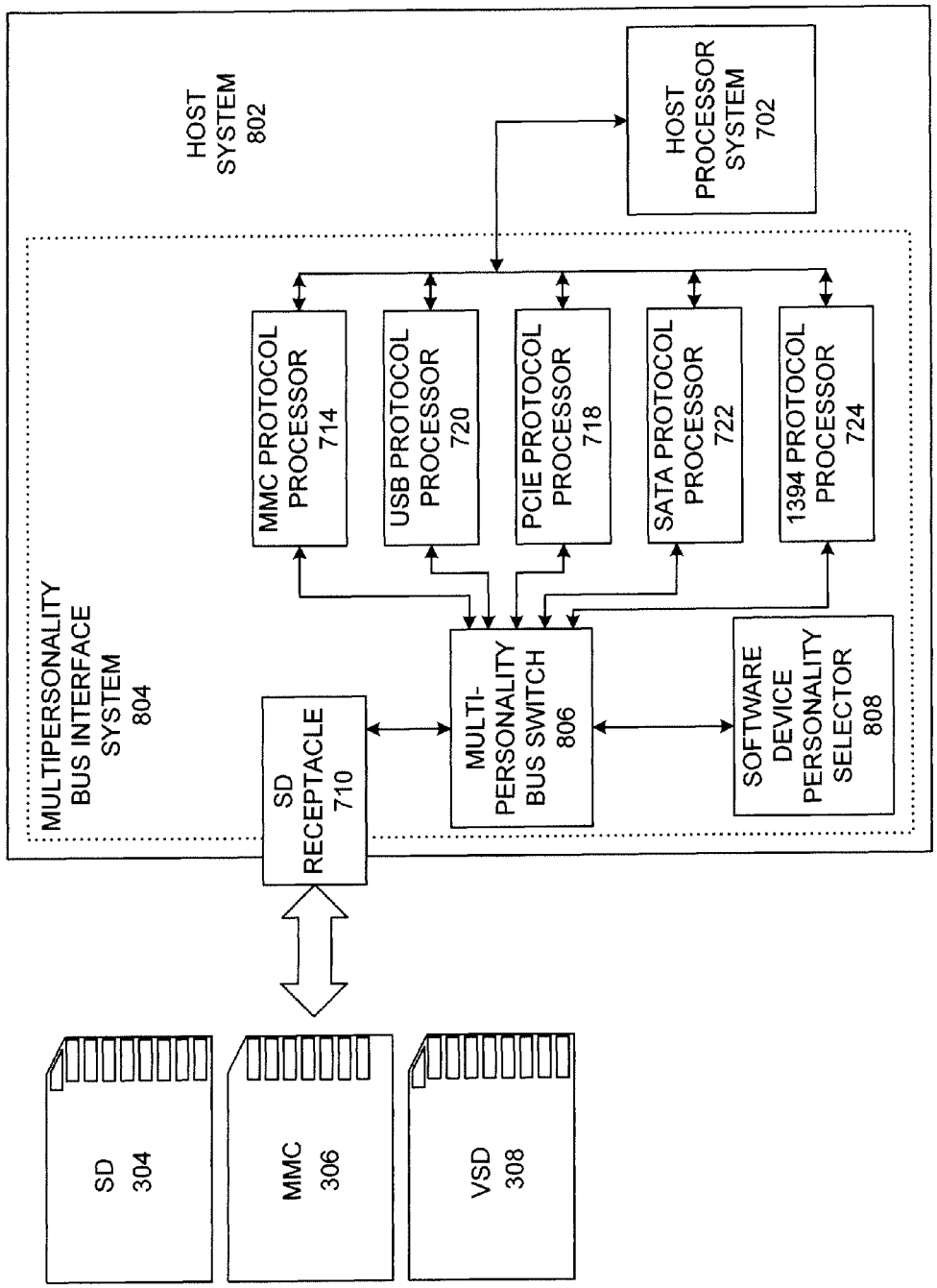
FIG. 8A illustrates, in accordance with an embodiment of the present invention, a block diagram of a host with an SD receptacle that supports extended-mode communication but without the SD communication mode.
Figure 8B:
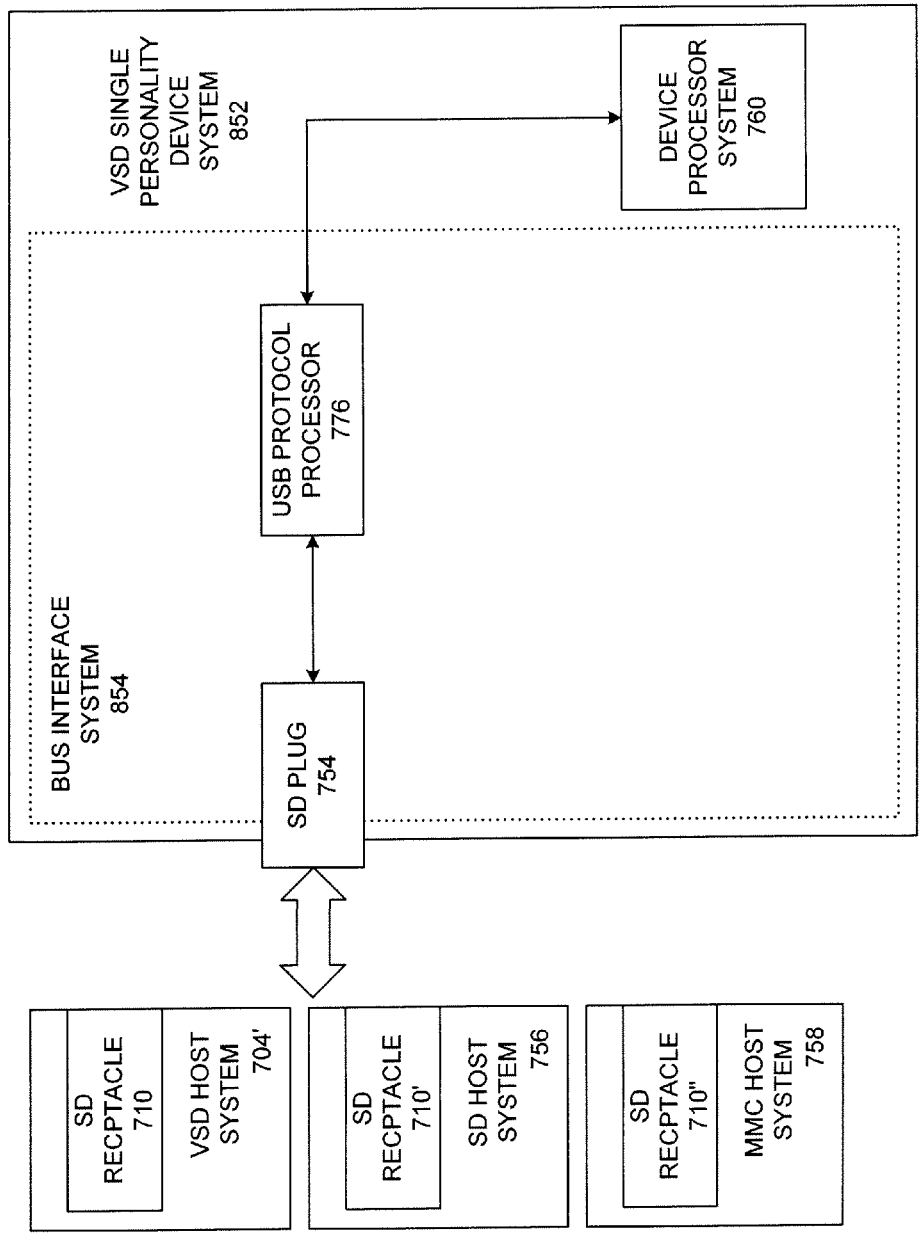
FIG. 8B illustrates, in accordance with an embodiment of the present invention, a block diagram of a VSD card device with an SD connector that supports VSD extended single mode communication but not the SD communication mode.

FIG. 8A illustrates, in accordance with an embodiment of the present invention, a block diagram of a host with an SD receptacle that supports extended-mode communication. SD card 304, MMC card 306, or VSD card 308 may be plugged into VSD receptacle 710 of host 704. Each card can operate in its own communication mode. Note that the host of FIG. 8A does not have SD as the default protocol. Further, SD card 304 cannot talk with host 802 any more because host 802, not having the SD protocol processor, does not support the SD mode. The flow chart for initializing host system 802 is, in accordance with an embodiment of the present invention, FIG. 6A.

Host 802 has processor system 702 for executing programs including card-management and bus-scheduling programs. Multi-personality bus interface 804 processes data from processor system 702 using various protocols. Protocols communicate with VSD receptacle 710 through multi-personality bus switch 806, which selects one protocol processor.

The contact pins in VSD receptacle 710 connect to multi-personality bus switch 806. Transceivers in multi-personality bus switch 806 buffer data to and from the transmit and receive pairs of differential data lines in the metal contacts for all protocols including USB, PCI-Express, IEEE 1394 Firewire, Serial-Attached SCSI, and SATA, and for the older MultiMediaCard.

When an initialization routine executed by processor system 702 determines that the inserted card is an MMC card, MMC processor 714 is activated to communicate with MMC card 306 inserted into VSD receptacle 710, while all other processors are disabled. Personality selector 808 configures multi-personality bus switch 806 to connect VSD receptacle 710 to MMC processor 714 when processor system 702 determines that the inserted card is MMC. Although many protocol processors are shown in the example of FIG. 8A, VSD host 802 may not support all protocols shown in FIG. 8A, but may only support a subset.

FIG. 8B illustrates, in accordance with an embodiment of the present invention, a block diagram of a VSD card device with an SD connector that supports VSD single mode communication. VSD card device 852 may be VSD card 308 of FIG. 7A with only 1 high-speed mode. Likewise, VSD host 704' may be the same as VSD host 704 of FIG. 7A, or could have only a subset of all the protocol processors that VSD host 704 of FIG. 7A has, or may support protocols not shown in FIG. 7A.

SD plug connector 754 of VSD card device 852 may be plugged into SD receptacle 710 of VSD host 704'. SD plug 754 of VSD card device 852 may also be plugged into SD receptacle 710' of SD host 756, which does not support the VSD mode. In this case, the communication will fail since the SD mode is not supported by VSD card device 852, which does not have a SD protocol processor. SD plug 754 of VSD card device 852 may be plugged into MMC receptacle 710" of MMC host 758, which does not support VSD mode, but does support MMC or SPI mode. The communication will fail also since the MMC or SPI mode is not supported by VSD card device 852, which does not have a MMC or SPI protocol processor.

Card device 852 has processor system 760 for executing programs including card-initialization and bus-response programs. Bus interface 854 processes data from processor system 760 using a dedicated protocol. USB protocol processor 776 is shown as an example. The flow chart for initializing card device 852 is, in accordance with an embodiment of the present invention, FIG. 6B.

The contact pins in SD plug 754 connect to the USB protocol processor. When an initialization routine executed by processor system 760, it will wait for the commands from its only communication mode, i.e., the USB mode in the example of FIG. 8B. If the host uses other communication mode, the device will not respond because it does not understand the communication packet sent by the host. When the host tries to use USB mode, the device will respond successfully.

Figure 9:
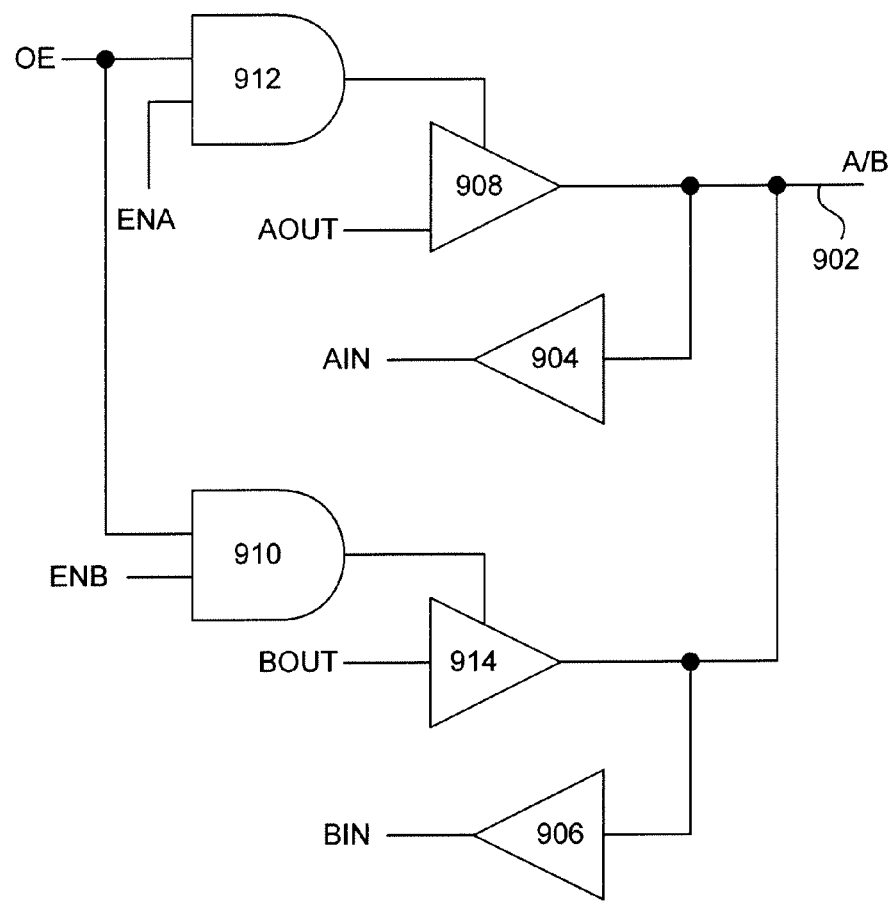
FIG. 9 illustrates, in accordance with an embodiment of the present invention, a functional diagram of a signal multiplexer.

FIG. 9 illustrates, in accordance with an embodiment of the present invention, a functional diagram of a signal multiplexer. The signal multiplexer of FIG. 9 may be employed to allow the multi-personality switch to connect the metal pads of the SD plug or SD receptacle to the appropriate protocol processor.

With reference to FIG. 9, shared line 902 may be connected to one of the metal contact pads in the SD connector, or may be an internal bus line. Input buffer 904 buffers line 902 to generate signal AIN for the A interface, while input buffer 906 buffers line 902 to generate BIN for the B interface. When line 902 is an output or is an I/O line that is being driven, output-enable signal OE is activated high. When the A interface is active, ENA is high and AND gate 912 drives a high to enable output buffer 908, which drives AOUT onto line 902. When the B interface is active, ENB is high and AND gate 910 drives a high to enable output buffer 914, which drives BOUT onto line 902.

Additional interfaces C, D, etc. can multiplex to the same line 902 by adding additional AND gates and input and output buffers. Additional enable signals ENC, END, etc. can be generated. The interfaces can be for MMC, USB, SATA, SAS, IEEE 1394, PCIE, and SD.

FIGS. 10A and 10B are tables showing, in accordance with embodiments of the present invention, the signal multiplexing scheme with a 9-pin SD connector. FIG. 10A presents the minimum signals that support the specified protocol. FIG. 10B presents the default values for the unused signals.

SD and MMC use a separate clock pin. A clock is input to the card on pin 5. This clock signal is only used for some protocols, for example SD, MMC, SPI and Enhanced MMC (EMMC). For PCI Express, REFCLK+ is used.

To gain higher speed, clock is embedded into the data line for the advanced protocols. One way to recover the embedded clock is to use data bit transition during serial transfer to confine the clock frequency for the receiving Phase Locked Loop. A data bit transition can be defined as an NRZI format to enforce a transition if multiple one or zero data bits occurred. In the other situation of 8 bit/10 bit data encoding, data transition is guaranteed in 10 bit data for each data byte.

There are at least 2 ways to enhance MMC. The first way is to keep CMD and CLK signals and protocols. Commands within CMD line are still synchronized by the CLK signal. Only the data is changed to differential serial data with embedded clock. The data is synchronized with the embedded clock. The second way is to use only the 2 differential serial data lines with embedded clock. CMD and CLK signals are thus not used and not required. The modified command protocol will be transmitted on these 2 data lines by packets. The advantage of this approach includes reduced pins, higher speed and reduced power. The reason for power reduction is because of the reduced voltage swing (about 400 mv) needed for reliable communication. Both can achieve higher transfer speed. Both approaches can also be applied to an enhanced SD (ESD) protocol.

MMC commands specify non-volatile memory operations quite extensively. Besides read and write, they also include erase related commands. Conventionally, the controller chip within MMC is intended to be fairly simple. This can be done by placing the translation table on the host side. This translation table is used to translate from logical address to physical address. Logical address is used by Operating System. Physical address is used by non-volatile memory. This way, all addresses transferred through the MMC connector are physical addresses.

A new alternative approach is devised to place the translation table to the controller chip within the MMC card. All addresses transferred through the MMC connector are logical addresses. One advantage for this new approach is the ability to simplify the host. Further, different flash memory cards may be employed since their differences are hidden or modularized from the host. Additionally, the command interfaces for different flash memory cards are much more similar than before. Still further, both logical and physical addresses can be supported through the MMC connector. This creates more flexibility. Because of the advantages above and the lower cost per silicon gate, the approach is highly advantageous.

Grounds are provided on pins 3 and 6. Power (VDD) is provided on pin 4. Since some protocol uses different power supply voltage, some voltage regulator may be employed to do the voltage conversion.

Pin 7 is a serial data I/O DAT0. This signal is only used for SD and MMC. This pin is DOUT for SPI data output signal. SPI is slower than normal SD mode and is thus used for legacy MMC hosts reading an SD card. USB can be extended to have 2 pairs of differential data lines to double the transmission speed. For Extended USB, pin 7 is used for D+. For PCI Express, REFCLK− is used. All other protocols may not need to use this pin.

Pin 2 is a bi-directional command CMD line for MMC and SD. USB interface do not use this signal. It can be disconnected (FIG. 10A) or it can be left as the default setting CMD (FIG. 10B). For SPI, this pin is a data input DIN. This pin is the positive data transmit signal for PCIE, SATA and 1394.

Pin 1 is DAT3 for SD and MMC. It is Chip Select for the SPI interface. USB do not use this signal and it is defaulted to DAT3. This pin is the negative data transmit signal for PCIE, SATA and 1394. For EUSB, D1− signal can reside on this pin.

The USB column is specifically for conventional USB protocol. The EMMC column uses a combination of MMC compatible commands and serial differential data transmission. The serial differential data transmission can be USB like. But it does not have to be full-blown USB protocol compatible. It can use slightly modified MMC commands.

For the SD interface, up to four data lines may be used at a time, although only one data line may be used during a particular communication session. Data line DAT0 is on pin 7, DAT1 on pin 8, DAT2 on pin 9, and DAT3 on pin 1.

The SPI interface does not use pins 8, 9. They can be defaulted to DAT1 and DAT2. USB and EMMC use these 2 pins for D− and D+. EUSB used pin 9 to be D1+. Pin 8 is the positive receive data signal for PCIE, SATA and 1394. Pin 9 is the negative receive data signal for PCIE, SATA and 1394.

When VSD mode is active and the USB protocol selected, serial USB data is transferred bi-directionally over the USB differential data lines D+, D−. The CMD, CLK, and DAT0 lines can still be connected to the SD processor, allowing 1-bit SD communication to continue while USB is being used. See FIG. 10B.

For EUSB, MMC commands still can be transmitted through CMD and CLK lines. This means MMC can be extended to use MMC commands but serial differential data to increase the data transmission speed. Besides, 2 pairs of serial differential data can be used.

When VSD mode is active and the PCIE protocol selected, serial PCI data is transferred over two pairs of differential data lines. Transmit lines PETp, PETn on pins 2, 1 are output by the host and received by the device, while receive lines PERp, PERn on pins 8, 9 are output by the device and received by the host.

When VSD mode is active and the SATA protocol selected, serial ATA data is transferred over two pairs of differential data lines. A lines A+, A− on pins 2, 1 are output by the host and received by the card, while B lines B+, B− on pins 8, 9 are output by the SD card and received by the host. SD communication stops while SATA is being used.

When VSD mode is active and the 1394 Firewire protocol selected, serial IEEE-1394 data is transferred over two pairs of differential data lines. Transmit-pair-A lines TPA, TPA* on pins 2, 1 are output by the host and received by the SD card, while transmit-pair-B lines TPB, TPB* on pins 8, 9 are output by the SD card and received by the host. SD communication stops while IEEE-1394 is being used.

Note that the above pin assignments to various signals of the various protocols are exemplar. Other pin assignment schemes are possible, as long as the host and device agree on a scheme to enable communication.

There are at least two ways to handle the unconnected pins. The first way is to drive with the default (SD) buffer. This is shown in FIG. 10B. The second way is to disconnect these pins. For example, with USB, pin 1, 2, 3, 5 and 7 can be disconnected. This is shown in FIG. 10A.

FIGS. 11A and 11B are tables showing, in accordance with embodiments of the present invention, signal multiplexing with a 7-pin MMC connector. FIG. 11A presents the minimum signals that support the specified protocol. FIG. 11B presents the default values for the unused signals.

Older legacy hosts may support only MMC. SD and MMC uses separate clock pin. A clock is input to the card on pin 5. This clock signal is only used for some protocols, for example SD, MMC, EMMC and SPI.

To gain higher speed, clock is embedded into the data line for the advanced protocols. One way to recover the embedded clock is to use data bit transition during serial transfer to confine the clock frequency for the receiving Phase Locked Loop. A data bit transition can be defined as an NRZI format to enforce a transition if multiple one or zero data bits occurred. In the other situation of 8 bit/10 bit data encoding, data transition is guaranteed in 10 bit data for each data byte.

Although there are 6 MMC signal pins, the MMC interface has an extra, unused pin, for a 7-pin physical interface. Power (VDD) is provided on pin 4, while grounds are provided on pins 3 and 6 for all protocols. A clock is input to the card on pin 5 for MMC, SPI and SD. USB do not use this pin and it is defaulted to CLK. Pin 5 is the negative receive data signal for PCIE, SATA and 1394.

Pin 7 is a serial data I/O DAT0 for MMC and SD. Pin 7 is the serial data out DOUT for SPI. This pin is D+ for USB and EMMC. This pin is the positive receive data signal for PCIE, SATA and 1394.

Pin 2 is a bi-directional command CMD line for MMC and SD interfaces, and is a serial data input DIN for SPI. It is kept as CMD for USB and EMMC. The intention is that MMC commands and differential serial data can run together in this arrangement. Future revision of MMC spec might use this new arrangement. It is positive transmit data signal for PCIE, SATA and 1394.

The SPI interface has a chip-select on pin 1. Pin 1 is not used for MMC and SD. It can be disconnected. It is D− for USB and EMMC and negative transmit data signal for PCIE, SATA and 1394.

For the SD interface, only one data line may be used.

When VSD mode is active and the USB protocol selected, serial USB data is transferred bi-directionally over the USB differential data lines D+, D− on pins 2, 1. Thus USB can still be supported when only 7 pins are available.

FIGS. 12A and 12B are tables showing, in accordance with embodiments of the present invention, pin multiplexing for an extended 13-pin connector. FIG. 12A presents the minimum signals that support the specified protocol. FIG. 12B presents the default values for the unused signals.

Additional pins 10-13 are used as data pins DAT[4:7] on an extended SD interface, and on an extended MMC interface. These additional 4 pins can be reserved for the serial-bus interfaces such as for the MMC specification version 4.0. EMMC and USB uses pin 12 and 13 for D+ and D−. EUSB uses these 4 pins for D2+, D2−, D3+ and D3−. All other protocols do not use these 4 pins. These 4 pins are shown to be defaulted to DAT[4:7] in FIG. 12B.

USB data uses pin 12 and 13. By assigning this way, SD and MMC with 4 data bits can still work simultaneously with USB. Extended USB has 2 pairs of differential data. The intention is to run MMC commands with 2 pairs of differential data. EUSB4 has 4 pairs of differential data. The intention is to run MMC commands with 4 pairs of differential data. For PCI Express, 3 more side band signals are added: PERST#, CLKREQ# and WAKE#.

FIGS. 13A and 13B are tables showing, in accordance with embodiments of the present invention, pin multiplexing for a 10-pin Memory Stick system. FIG. 13A presents the minimum signals that support the specified protocol. FIG. 13B presents the default values for the unused signals.

Rather than use SD as before, the extended interface may be designed for other card base-protocols, such as Memory Stick (MS). MS uses separate clock pin. A clock is input to the card on pin 8. This clock signal is only used for some protocols, for example Memory Stick, MS Pro Duo and Extended Memory Stick(EMS).

To gain higher speed, clock is embedded into the data line for the advanced protocols. One way to recover the embedded clock is to use data bit transition during serial transfer to confine the clock frequency for the receiving Phase Locked Loop. A data bit transition can be defined as an NRZI format to enforce a transition if multiple one or zero data bits occurred. In the other situation of 8 bit/10 bit data encoding, data transition is guaranteed in 10 bit data for each data byte.

Memory Stick has a 10-pin connector, with power on pins 3 and 9, and ground on pins 1 and 10. Pin 8 is a system clock (SCLK) input (REFCLK+ for PCIE), while pin 2 is a bus-state (BS) input (REFCLK— for PCIE). Data is carried bi-directionally by DAT0 on pin 4. This same pin 4 is used as positive transmit data signal for PCIE, SATA and 1394. This pin is used as D1+ for extended USB. The intention is to use MS command protocols and 2 pairs of differential data for EUSB.

Pin 6 is an insertion (INS) pin that can be pulled up by a resistor on the MS card to indicate that the card has been inserted. All protocols can use this same pin for the same purpose.

Pins 5 and 7 are reserved for MS, but are used by an extension known as MS Pro Duo. MS Pro Duo has a 4-bit data bus, DAT[0:3], using pins 4, 3, 5, 7, respectively. Pin 5 and 7 are used as D+ and D− for Extended MS and USB and EUSB. By assigning this way, both USB and 1 bit MS can work at the same time. Besides, differential data can be used together with MS command protocols in EMS column. Pin 5 is the negative receive data signal for PCIE, SATA and 1394. Pin 7 is the positive receive data signal for PCIE, SATA and 1394.

One less power is available for MS Pro Duo, since pin 3 is used for DAT1 rather than VCC. This same pin is used as D1− for EUSB and negative transmit data signal for PCIE, SATA and 1394.

For PCIE communication, pins 4, 3 carry the PCI Express transmit differential data pair PETp, PETn, while pins 7, 5 carry the PCI Express receive differential data pair, PERp, PERn. Likewise, for SATA communication, pins 4, 3 carry the SATA transmit differential data pair T+, T−, while pins 7, 5 carry the SATA receive differential data pair, R+, R−. For IEEE 1394 communication, pins 4, 3 carry the 1394 A differential data pair TPA, TPA*, while pins 7, 5 carry the 1394 B differential data pair, TPB, TPB*.

Note that the above pin assignments to various signals of the various protocols are exemplar. Other pin assignment schemes are possible, as long as the host and device agree on a scheme to enable communication.

All interfaces defined and described above can be used for any I/O device. Flash memory is an important application but is not the only one.

Alternate Embodiments

Several other embodiments are contemplated by the inventors. For example, a variety of materials may be used for the card substrate, circuit boards, metal contacts, card case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes.

Many protocols such as PCI-Express, USB, Serial ATA, Serial Attached SCSI, or IEEE 1394 Firewire can be used as the second interface. The host may support various serial-bus interfaces, and can first test for USB operation, then IEEE 1394, then SATA, then SA SCSI, etc, and later switch to a higher-speed interface such as PCI-Express.

The SD card may be replaced by a Memory Stick (MS) card, a MS Pro card, a MS Duo card, a MS Pro Duo card, a Mini-SD card, a reduced-size MMC card(7/9/13 pins), etc. A pull-up resistor may be added on the card device to a ground pin to be used as a card-detect line.

A special LED can be designed to inform the user which electrical interface is currently in use. For example, if the standard SD interface is in use, then this LED can be turned on. Otherwise, this LED is off. If more than 2 modes exists, then a multi-color LED can be used to specify the mode, such as green for PCI-Express and yellow for USB.

Different power-supply voltages may be used. USB and SATA may use a 5-volt supply, while SD and MMC use a 3.3-volt supply, and PCIE uses a 1.5-volt supply. A 3.3-volt supply may be applied to the VCC pin, and an internal voltage converter on the VSD card could generate other voltages, such as 5 volts using a charge pump, and 1.5 volts using a DC-to-DC converter.

System bus management functions can be achieved by the two differential pairs of the VSD/PCIE interface.

If more pins are available, the side band signals in Express-Card can be added, like CPPE#, CPUSB#, CLKREQ#, PERST#, WAKE#, +3.3AUX, SMBDATA, SMBCLK, etc.

The approach of using the modified PCI Express signals can be applied to the designs of the fully buffered memory modules of DRAMs.

FIG. 14 is a table showing, in accordance with an embodiment of the present invention, signal multiplexing with a 9-pin MMC connector. The MMC/Smart Card column is a major variation from the previous arrangements because it can support both protocols simultaneously. The USB/Smart Card column is another major variation from the previous arrangements because it can also support both protocols simultaneously.

Smart Card may include the SIM format. Software can decide which communication mode to use. SD and MMC uses separate clock pin. A clock is input to the card on pin 5. To gain higher speed, clock is embedded into the data line for the advanced protocols. One way to recover the embedded clock is to use data bit transition during serial transfer to confine the clock frequency for the receiving Phase Locked Loop. A data bit transition can be defined as an NRZI format to enforce a transition if multiple one or zero data bits occurred. In the other situation of 8 bit/10 bit data encoding, data transition is guaranteed in 10 bit data for each data byte. In USB/Smart Card column, pins 1, 2, 5, 6 and 7 are used for Smart Card or SIM card.

FIG. 15 is a table showing, in accordance with an embodiment of the present invention, signal multiplexing with a 13-pin MMC connector. The 9 pin (4 data bits) MMC with Smart Card column is a major variation from the previous arrangements because it can support 4-bit MMC and smart card protocols simultaneously. The 9-pin (4 data bits) SD with Smart Card column is another major variation from the previous arrangements because it can support 4 bit SD and smart card protocols simultaneously. The EMMC/Smart Card column supports MMC command protocol with the serial differential data. It also supports the Smart Card protocol. Smart Card may include the SIM format. Software can decide which communication mode to use. SD and MMC uses separate clock pin. A clock is input to the card on pin 5. This clock signal is only used for some protocols, for example SD, MMC 9/13 and SPL For PCIE, this pin 5 is REFCLK+.

To gain higher speed, clock is embedded into the data line for the advanced protocols. One way to recover the embedded clock is to use data bit transition during serial transfer to confine the clock frequency for the receiving Phase Locked Loop. A data bit transition can be defined as an NRZI format to enforce a transition if multiple one or zero data bits occurred. In the other situation of 8 bit/10 bit data encoding, data transition is guaranteed in 10 bit data for each data byte.

In USB/Smart Card column, pins 10, 11, 12 and 13 are used for Smart Card or SIM card. There are 2 types for the simultaneous dual mode. The first type is with SD native protocol. The first part of the initialization process is shown in FIG. 5A. The card will respond with ACMD1, step 518. Therefore, VSD is recognized, step 528. When analyzing the response packet from the card, step 530, it will be shown that the device can support dual mode simultaneously, step 532. During VSD Card Initialization process, step 534, SD and the other advanced mode will be initialized. After that, both modes can be used for communication.

For the device of this first type, see FIG. 5B. In step 554, both modes are initialized. In step 570, commands from these 2 modes can be executed.

The second type of the simultaneous dual mode is without SD mode. For this case, FIG. 6A can be employed. The device status packet sent to CPU (step 612) will contain this simultaneous dual mode information. Then CPU will load these 2 device drivers (step 614). The application software can use both modes to communicate.

For the device of this second type, see FIG. 6B. In step 654, both modes will be initialized. When trying to recognize commands, commands from either mode can be recognized, step 656. These commands will be executed in their respective mode, step 658.

Normally, the MMC flash card is defined as "electrical protocol is MMC and mechanical form factor is MMC." Normally, the SD flash card is defined as "electrical protocol is SD and mechanical form factor is SD." A new Super Digital Card (SDC) is invented. It is defined as "electrical protocol is MMC and mechanical form factor is SD."

The advantage of this new design of SDC is that the MMC flash memory design has another dimension by using the SD mechanical form factor. The advantage is as follows. Since MMC form factor is quite thin (1.4 mm), this forces manufacturers to use flash memory chips in die form or WSOP (Very Very Small Outline Package, 0.7 mm), By expanding the form factor to the SD thickness (2.1 mm), another flash memory chip package—TSOP (Thin Small Outline Package, 1.1 mm) can be used. This new SDC design greatly increases the production flexibility.

A special LED can be designed to inform the user which electrical interface is currently in use. For example, if the standard USB interface is in use, then this LED can be turned on. Otherwise, this LED is off. If more than 2 modes exists, then a multi-color LED can be used to specify the mode, such as green for PCI-Express and yellow for standard USB.

Figure 16:
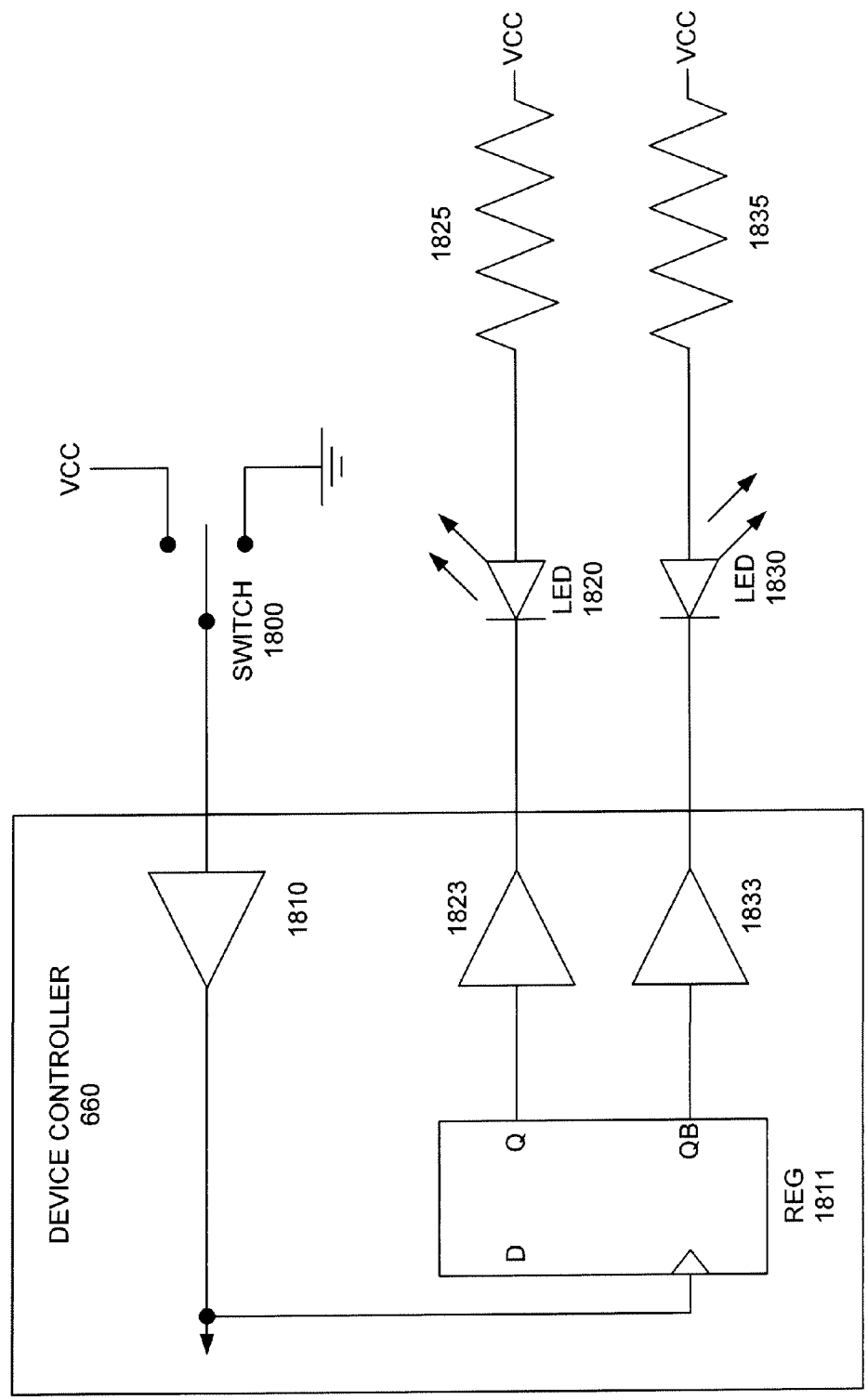
FIGS. 16, 17 and 18 show LED circuitry for indicating mode in a VSD device.

For example, if a VSD device can communicate using either the USB or PCI Express mode, a hardware switch may be employed to select the mode, and an LED Logic circuit may indicate the communication mode to the user. FIG. 16 shows one such implementation. The basic LED circuit includes a LED, current limiting resistor and a buffer within the controller. The LED will be on whenever there is a current flowing across it from the anode to cathode. The detection and LED buffer may be implemented with General Purpose Input/Output (GPIO) port, for example.

In FIG. 16, the USB mode is selected with SW1 switched to VCC; whereas PCI Express mode is selected with SW1 switched to ground. The selected mode is then stored to configuration register REG1 via the detect circuit. As shown, there are two LEDs for mode indication, i.e. LED 1830 will be turned on when USB mode is selected. Otherwise, LED 1820 will be on for PCI Express mode.

Figure 17:
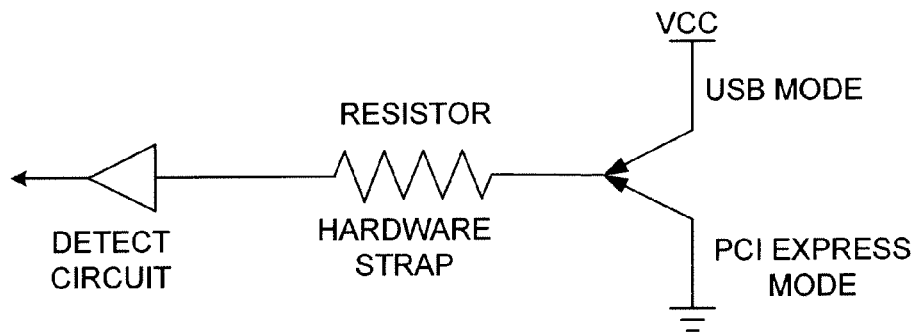
Figure 18:
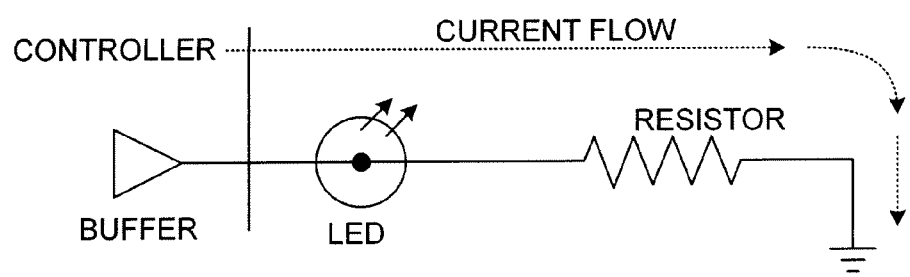

Alternatively, hardware strapping may be employed to indicate the communication mode of such multi-protocol capable device. FIG. 17 shows one implementation of hardware strapping. As a further alternative, the mode of protocol may be directly programmed into configuration without the need for hardware switch. During the device configuration stage, the software may store the mode setting from auto mode detection (if the device has an intelligent algorithm to determine the proper mode) or may download the mode setting from a non-volatile storage device, for example. As a further alternative, the LED circuit portion of FIG. 16 may be implemented by the LED circuit of FIG. 18. In FIG. 18, the device controller sources current into the LED when the buffer output is driven high.

Figure 19:
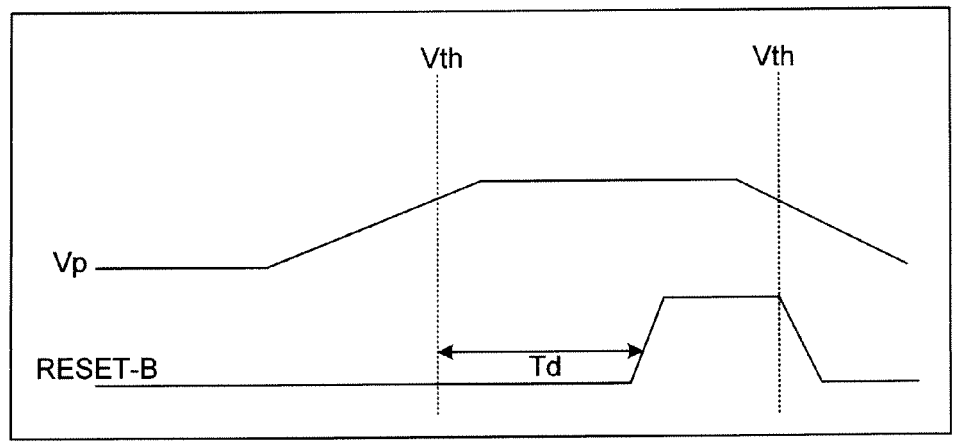
FIG. 19 shows a timing diagram to facilitate discussion of reset signal generation.
Figure 20:
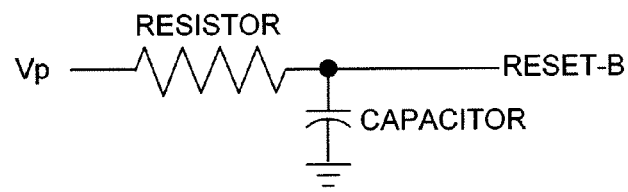
FIGS. 20 and 21 show reset circuitry for use in resetting a VSD device.
Figure 21:
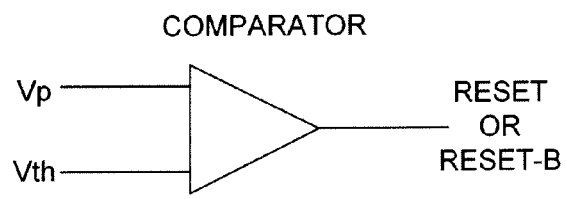

There are times when it may be desirable to generate a clean reset signal for the card. For example, if the power supply voltage drops below a threshold voltage, it may be desirable to assert a reset signal and keep the reset signal asserted for some time interval (Td) after the power supply voltage rises above the threshold voltage to give the multi-personality device time to stabilize itself (see FIG. 19). One way to implement the reset circuit involves an RC circuit, such as that shown in FIG. 20. However, it is also possible to implement the reset circuit using a voltage comparator if more precision is desired. In the voltage comparator implementation of FIG. 21; the divided supply voltage (Vp) is compared to the threshold voltage (Vth), and the reset signal is asserted whenever Vp is below Vth. The reset output may be either active high or active low. The reset output may be configured as either push/pull or open drain.

In some cases, it may be desirable to endow the VSD card with user-settable write-protect indication to prevent the unintentionally alteration of the information, such as information stored in storage device (e.g., removable flash media). An implementation of the write protect logic may include a write protect switch and a detect circuit.

Figure 22A:
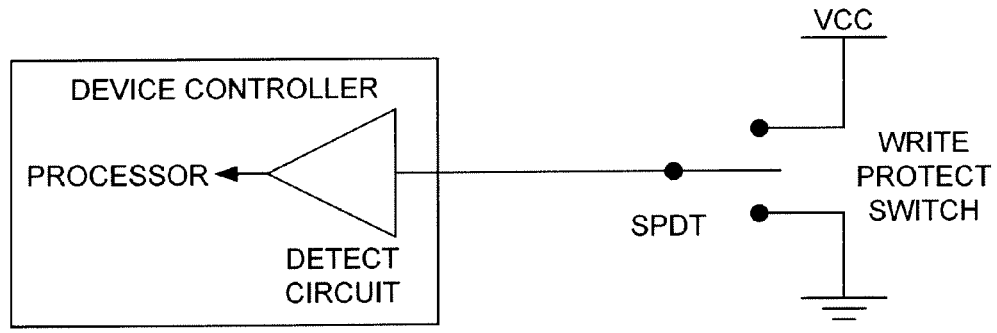
FIGS. 22A, 22B and 22C illustrate respectively implementations using a single position double throw (SPDT) switch, a single pole single throw (SPST) switch, and another single pole single throw (SPST) switch to provide for write protect logic for a VSD device.
Figure 22B:
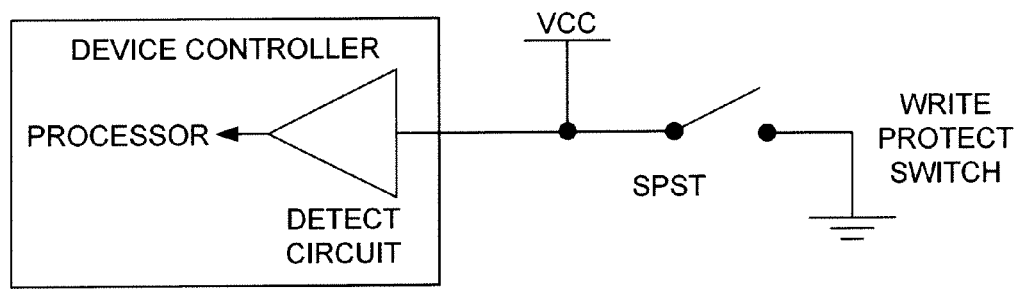
Figure 22C:
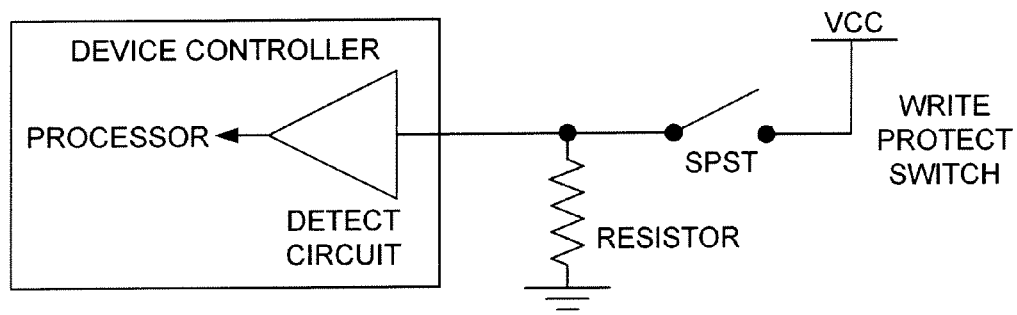

In one embodiment, the user may manually set the write protect switch to produce to the detect circuit two electrical polarities, i.e. enable or disable. The detect circuit normally may be an input port or general-purpose input/output (GPIO) port of the device controller. The detected polarity is then used to instruct the processor to govern the write behavior to the storage subsystem of the peripheral device. In other words, the write access is prohibited if the write protect switch is enabled; otherwise the write access is allowed. FIGS. 22A, 22B and 22C illustrate respectively implementations using a single pole double throw (SPDT) switch, a single pole single throw (SPST) switch whereby the pull up resistor sets the default polarity as high, and single pole single throw (SPST) switch whereby a pull down resistor sets the default polarity as low.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a host having a receptacle that is configured to be at least mechanically compatible with at least one of an industry-standard Secure Digital (SD) plug and an industry-standard MultiMedia Card (MMC) plug, a method for communicating with a device inserted into the receptacle using a host processor, the method comprising:
   determining that said device supports both a first protocol and an industry standard SD protocol; and
   establishing communications between the host processor and said device by enabling one of a plurality of protocol processors to communicate with said host processor such that communications between the host processor and the device are performed by way of said one of said plurality of protocol processors, wherein said one of said plurality of protocol processors supports said first protocol.

2. The method of claim 1, wherein enabling said one of said plurality of processors comprises enabling a processor supporting one of USB, PCIE, SATA, and IEEE 1394.

3. The method of claim 2 wherein establishing communications between the host processor and said device further comprises utilizing one pair of pins of said receptacle to carry a first pair of differential data signals (A− and A+) between said host processor and said device, and utilizing another pair of pins of said receptacle to carry a second pair of differential data signals (B− and B+) between said host processor and said device.

4. In a host having a receptacle that is configured to be at least mechanically compatible with at least one of an industry-standard Secure Digital (SD) plug and an industry-standard MultiMedia Card (MMC) plug, a method for communicating with a device using a host processor, the method comprising:
  detecting the presence of said device in said receptacle;
  transmitting a sequence of commands to the device, a first one of said sequence of commands being supported by one of an industry standard SD protocol and an MMC protocol, and a second one of said sequence of commands being supported by a protocol other than said industry standard SD protocol and said industry standard MMC protocol;
  when said device transmits a first predetermined response to the host processor in response to the first one of the sequence of commands, establishing communications between the host processor and said device by enabling a first protocol processor of a plurality of protocol processors to communicate with said host processor such that communications between the host processor and the device are performed by way of said first protocol processor, wherein said first protocol processor supports said one of said industry standard SD protocol and said MMC protocol; and
  when said device transmits a predetermined response to the host processor in response to the second one of the sequence of commands, establishing communications between the host processor and said device by enabling a second protocol processor of said plurality of protocol processors to communicate with said host processor such that communications between the host processor and the device are performed by way of said second protocol processor, wherein said second protocol processor supports said protocol other than said industry standard SD protocol and said industry standard MMC protocol.

5. The method of claim 4, wherein enabling said second protocol processor comprises enabling a processor supporting one of USB, PCIE, SATA, and IEEE 1394.

6. The method of claim 5 wherein establishing communications between the host processor and said device further comprises utilizing one pair of pins of said receptacle to carry a first pair of differential data signals (A− and A+) between said host processor and said device, and utilizing another pair of pins of said receptacle to carry a second pair of differential data signals (B− and B+) between said host processor and said device in accordance with said protocol other than said industry standard SD protocol and said industry standard MMC protocol.

7. In a host having a receptacle that is configured to be at least mechanically compatible with at least one of an industry-standard Secure Digital (SD) plug and an industry-standard MultiMedia Card (MMC) plug, a method for communicating with a device inserted into said receptacle using a host processor, the method comprising:
  transmitting a first command to the device, the first command being supported by one of an industry standard SD protocol and an MMC protocol;
  transmitting a second command to the device when said device transmits a first predetermined response to the host processor in response to the first command, the second command being supported by a protocol other than said industry standard SD protocol and said industry standard MMC protocol;
  when said device transmits a second predetermined response to the host processor in response to the second command, establishing communications between said device and said host processor using said protocol other than said industry standard SD protocol and said industry standard MMC protocol; and
  when said device fails to transmit said second predetermined response to the host processor in response to the second command, establishing communications between said device and said host processor using said one of said industry standard SD protocol and said industry standard MMC protocol.

8. The method of claim 7, wherein establishing communications using said protocol other than said industry standard SD protocol and said industry standard MMC protocol comprises using a protocol selected from the group including USB, PCIE, SATA, and IEEE 1394.

9. The method of claim 8 wherein establishing communications between the host processor and said device using said protocol further comprises utilizing one pair of pins of said receptacle to carry a first pair of differential data signals (A− and A+) between said host processor and said device, and utilizing another pair of pins of said receptacle to carry a second pair of differential data signals (B− and B+) between said host processor and said device.

10. In a host having a receptacle that is configured to be at least mechanically compatible with at least one of an industry-standard Secure Digital (SD) plug and an industry-standard MultiMedia Card (MMC) plug, a method for communicating with a device inserted into said receptacle using a host processor, the method comprising:
  transmitting a command to the device, the command being supported by a protocol other than an industry standard SD protocol and an industry standard MMC protocol;
  when said device transmits a predetermined response to the host processor in response to the command, establishing communications between said device and said host processor using one pair of pins of said receptacle to carry a first pair of differential data signals (A− and A+) between said host processor and said device, and utilizing another pair of pins of said receptacle to carry a second pair of differential data signals (B− and B+) between said host processor and said device, said first and second pairs of differential data signals being generated in accordance with said protocol other than said industry standard SD protocol and said industry standard MMC protocol.

11. The method of claim 10, wherein establishing communications using said protocol other than said industry standard SD protocol and said industry standard MMC protocol comprises using a protocol selected from the group including USB, PCIE, SATA, and IEEE 1394.

12. In a multi-protocol device having a plug configured to be mechanically compatible with at least one of an industry-standard Secure Digital (SD) receptacle and an industry-standard MultiMedia Card (MMC) receptacle disposed on a host, a method for communicating with a host processor of the host when said device is operably inserted into said receptacle, the method comprising:

determining that said host supports both (a) one of an industry standard SD protocol and an industry standard MMC protocol, and (b) a protocol other than said industry standard SD protocol and said industry standard MMC protocol; and establishing communications between the host processor and said device by configuring a multi-protocol element to enable one of a plurality of protocol processors to communicate with a device processor such that communications between the host processor and the device processor are performed by way of said one of said plurality of protocol processors, said multi-protocol element, said plurality of protocol processors and said device processor being disposed on the device, wherein said one of said plurality of protocol processors supports said protocol other than said industry standard SD protocol and said industry standard MMC protocol.

13. The method of claim 12, wherein enabling said one of said plurality of protocol processors comprises enabling a processor supporting one of USB, PCIE, SATA, and IEEE 1394.

14. The method of claim 13 wherein establishing communications between the host processor and said device further comprises utilizing one pair of pins of said device to carry a first pair of differential data signals (A− and A+) between said host processor and said device, and utilizing another pair of pins of said device to carry a second pair of differential data signals (B− and B+) between said host processor and said device.

15. In a single-mode device configured to communicate with a host, the device having a plug configured to be at least mechanically compatible with at least one of an industry-standard Secure Digital (SD) receptacle and an industry-standard MultiMedia Card (MMC) receptacle, a method comprising:

determining that said host supports a protocol other than an industry standard SD protocol and an industry standard MMC protocol; and establishing communications between said device and said host processor using one pair of pins of said device to carry a first pair of differential data signals (A− and A+) between said host processor and said plug, and utilizing another pair of pins of said plug to carry a second pair of differential data signals (B− and B+) between said host processor and said device, said first and second pairs of differential data signals being generated in accordance with said protocol other than said industry standard SD protocol and said industry standard MMC protocol.

16. The method of claim 15, wherein establishing communications using said protocol other than said industry standard SD protocol and said industry standard MMC protocol comprises using a protocol selected from the group including USB, PCIE, SATA, and IEEE 1394.

\* \* \* \* \*